United States Patent
Stokking et al.

(10) Patent No.: US 12,096,090 B2
(45) Date of Patent: Sep. 17, 2024

(54) FACILITATING VIDEO STREAMING AND PROCESSING BY EDGE COMPUTING

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Hans Maarten Stokking, Wateringen (NL); Hendrikus Nathaniël Hindriks, Gouda (NL)

(73) Assignees: KONINKLIJKE KPN N.V., Rotterdam (NL); NEDERLANDSE ORGANISATIE VOOR TOEGEPAST-NATUURWETEN-SCHAPPELIJK Onderzoek TNO, 'S-Gravenhage (NL)

( * ) Notice: Subject to any disclaimer, the term of this patent is extended or adjusted under 35 U.S.C. 154(b) by 199 days.

(21) Appl. No.: 17/626,974

(22) PCT Filed: Jul. 14, 2020

(86) PCT No.: PCT/EP2020/069847
§ 371 (c)(1),
(2) Date: Jan. 13, 2022

(87) PCT Pub. No.: WO2021/009155
PCT Pub. Date: Jan. 21, 2021

(65) Prior Publication Data
US 2022/0279254 A1    Sep. 1, 2022

(30) Foreign Application Priority Data
Jul. 17, 2019 (EP) .................................... 19186699

(51) Int. Cl.
*H04N 21/647* (2011.01)
*H04L 65/61* (2022.01)
*H04N 21/2365* (2011.01)

(52) U.S. Cl.
CPC ....... *H04N 21/64784* (2013.01); *H04L 65/61* (2022.05); *H04N 21/2365* (2013.01); *H04N 21/64761* (2013.01)

(58) Field of Classification Search
CPC ......... H04N 21/64784; H04N 21/2365; H04N 21/64761
(Continued)

(56) References Cited

U.S. PATENT DOCUMENTS 7,519,229 B2    4/2009  Wallace et al.
9,621,853 B1 *  4/2017  Yang .......................... G06F 8/61
(Continued)

FOREIGN PATENT DOCUMENTS

CN    103517126 A    1/2014
CN    104641651 A    5/2015
(Continued)

OTHER PUBLICATIONS

C. Concolato et al., "Adaptive Streaming of HEVC Tiled Videos Using MPEG-DASH," in IEEE Transactions on Circuits and Systems for Video Technology, vol. 28, No. 8, pp. 1981-1992, Aug. 2018, doi: 10.1109/TCSVT.2017.2688491. (Year: 2018).*

Baldoni et al., An Open-source Virtual Set-top-box for Softwarized Networks, Jul. 1, 2017, IEEE, 1-6 (Year: 2017).*

Feldman, C., et al., "Efficient Stream-Reassembling for Video Conferencing Applications using Tiles in HEVC," In Proc. of International Conferences on Advances in Multimedia (MMEDIA) 130-135 (2013).

(Continued)

Primary Examiner — Cynthia M Fogg
(74) Attorney, Agent, or Firm — Hamilton, Brook, Smith & Reynolds, P.C.

(57) ABSTRACT

A system and computer-implemented method are provided for facilitating a video streaming which comprises a plurality of transmitter devices each transmitting a respective video via a telecommunication network and a receiver device receiving the respective videos via the telecommunication network. The system may comprise an edge node which may receive video from a transmitter device in uncompressed form or in compressed form as a low latency (Continued)

video stream, process the video and encode the processed video as a tile-based video stream. A combiner may then, in the compressed domain, combine any received tile-based video streams to obtain a combined tile-based video stream which contains tiles of the videos of at least two transmitter devices and which may be decodable by a single decoder instance.

13 Claims, 28 Drawing Sheets

(58) Field of Classification Search
USPC .......................................................... 725/62
See application file for complete search history.

(56) References Cited

U.S. PATENT DOCUMENTS

| | | | |
|---|---|---|---|
| 10,237,581 | B2 | 3/2019 | Henaire et al. |
| 10,397,666 | B2 | 8/2019 | Thomas et al. |
| 10,674,185 | B2 | 6/2020 | Thomas et al. |
| 10,694,192 | B2 | 6/2020 | Thomas et al. |
| 10,715,843 | B2 | 7/2020 | Van Brandenburg et al. |
| 10,721,530 | B2 | 7/2020 | Van Brandenburg et al. |
| 11,153,580 | B2 | 10/2021 | Bangma et al. |
| 2005/0008240 | A1 | 1/2005 | Banerji et al. |
| 2009/0143007 | A1 | 6/2009 | Terlizzi |
| 2009/0179904 | A1* | 7/2009 | Racicot .............. H04N 21/4316 345/505 |
| 2009/0235283 | A1 | 9/2009 | Kim et al. |
| 2010/0312905 | A1 | 12/2010 | Sandmann et al. |
| 2012/0075469 | A1* | 3/2012 | Oskin .............. H04N 21/21815 348/143 |
| 2014/0010289 | A1 | 1/2014 | Lukasik et al. |
| 2016/0080692 | A1* | 3/2016 | Hsu ........................ H04N 7/152 348/14.08 |
| 2018/0197012 | A1* | 7/2018 | Wengrovitz ............ G06F 18/24 |
| 2018/0242028 | A1* | 8/2018 | Van Brandenburg ........................ H04N 21/8456 |
| 2018/0270287 | A1 | 9/2018 | Ouedraogo et al. |
| 2018/0338017 | A1* | 11/2018 | Mekuria ............. H04L 67/1097 |
| 2019/0124397 | A1 | 4/2019 | Takahashi et al. |
| 2021/0409798 | A1 | 12/2021 | Maze et al. |
| 2022/0329883 | A1 | 10/2022 | Stokking et al. |
| 2022/0345762 | A1 | 10/2022 | Fishman |

FOREIGN PATENT DOCUMENTS

| | | |
|---|---|---|
| CN | 106796794 A | 5/2017 |
| CN | 108476327 A | 8/2018 |
| CN | 109565611 A | 4/2019 |
| CN | 109691113 A | 4/2019 |
| DE | 102017110431 A1 | 11/2018 |
| EP | 1487214 A1 | 12/2004 |
| EP | 2 081 384 A2 | 7/2009 |
| EP | 2 081 384 A3 | 6/2012 |
| JP | 2005-020463 A | 1/2005 |
| WO | 2021043706 | 3/2021 |

OTHER PUBLICATIONS

Misra, K. et al., "An Overview of Tiles in HEVC," IEEE, Journal of Selected Topics in Signal Processing, 7(6): 969-977 (2013).
Niamut, K. et al., "MPEG DASH SRD—Spatial Relationship Description," (2016).
Sanchez, Y. et al., "Low Complexity Cloud-video-Mixing Using HEVC," The 11th Annual IEEE CCNC—Multimedia Networking, Services and Applications, (2014).
International Search Report and Written Opinion for International Application No. PCT/EP2020/069847, entitled "Facilitating Video Streaming and Processing by Edge Computing," consisting of 12 pages. Date of Mailing: Jul. 31, 2020.
Extended European Search Report for International Application No. 19186699.5, entitled "Facilitating Video Streaming and Processing by Edge Computing," consisting of 9 pages. Jan. 10, 2019.
Alvarez, F., et al., "An Edge-to-Cloud Virtualized Multimedia Service Platform for 5G Networks," *IEEE Transactions on Broadcasting*, pp. 1-12 (2019).
Bachhuber, C., et al., "Are Today's Video Communication Solutions Ready for the Tactile Internet?," [retrieved on Dec. 12, 2018 at: https://www.researchgate.net/publication/316722252].
Burgos-Artizzu, X. P., et al., "Real-Time Expression-Sensitive HMD Face Reconstruction," *Computer Science SIGGRAPH Asia 2015 Technical Briefs*, pp. 1-4 (2015).
Feldmann, C., et al., "Efficient Stream-Reassembling for Video Conferencing Applications using Tiles in HEVC," *Proc. of International Conferences on Advances in Multimedia (MMEDIA)* pp. 130-135 (2013).
Hart, C. "Optimizing video quality using Simulcast (Oscar Divorra)" webrtcH4cKS pp. 1/8, [retrieved on Sep. 5, 2019 at https://webrtchacks.com/sfu-simulcast/].
Kondo, T., et al: "Development and Evaluation of the MEC Platform Supporting the Edge Instance Mobility", *2017 IEEE 41st Annual Computer Software and Applications Conference (Compsac)*, vol. 2, pp. 193-198 (2018).
Misra, K., et al. "An Overview of Tiles in HEVC", IEEE Journal of Selected Topics in Signal Processing, vol. 7, No. 6, pp. 969-977 (2013).
MPEG, ISO/IEC JTC1/SC29/WG11 MPEG2018/N17502, Use cases and requirements for NBMP (v4), Apr. 2018.
Prins, M. J., et al., "Togethervr: A Framework for Photo-Realistic Shared Media Experiences in 360-Degree Vr," *TNO, The Netherlands* (2017).
Park, K., and Mekuria, R., "Use cases and requirements for NBMP (v4)", ISO/IEC JTC1/SC29/WG11 MPEG2018/N17502, Apr. 2018.
Sanchez, Y. et al., "Low Complexity Cloud-Video-Mixing Using Hevc", *IEEE 11th Consumer Communications and Networking Conference*, pp. 415-420 (2014).
Zhang, L., et al., "On Energy-Efficient Offloading in Mobile Cloud for Real-Time Video Applications", *IEEE Transactions on Circuits and Systems for Video Technology, Institute of Electrical And Electronics Engineers*, vol. 27, No. 1, pp. 170-181 (2017).
Feng Yuan, "Research on the Guaranteed Speed of Mobile Phone Videos with Different Definitions," Telecommunications Technology, issue 3, pp. 48-51, Mar. 2017.

* cited by examiner

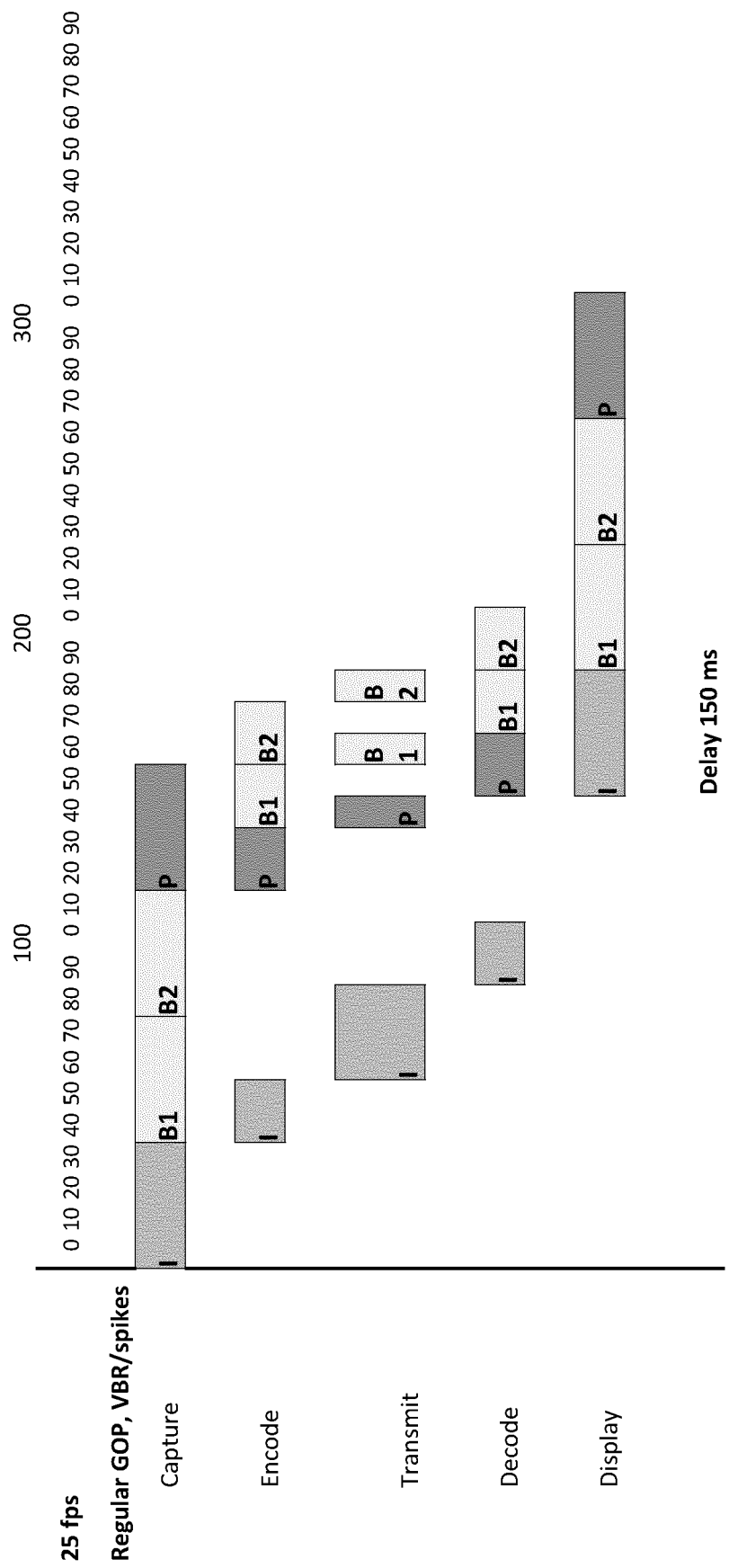

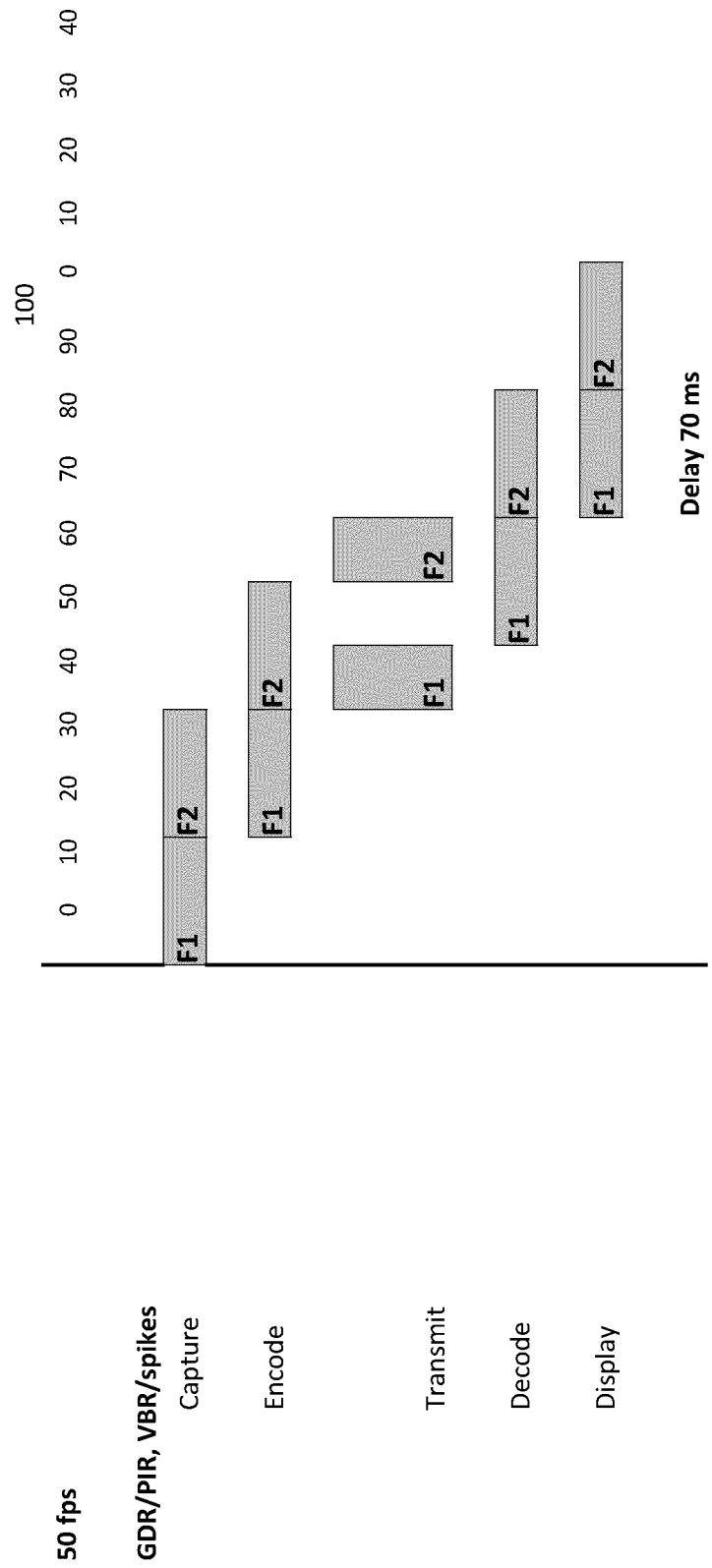

FACILITATING VIDEO STREAMING AND PROCESSING BY EDGE COMPUTING

This application is the U.S. National Stage of International Application No. PCT/EP2020/069847, filed Jul. 14, 2020, which designates the U.S., published in English, and claims priority under 35 U.S.C. § 119 or 365(c) to European Application No. 19186699.5, filed Jul. 17, 2019. The entire teachings of the above applications are incorporated herein by reference.

FIELD OF THE INVENTION

The invention relates to a system and computer-implemented method for facilitating a video streaming which comprises a plurality of transmitter devices each transmitting a respective video via a telecommunication network and a receiver device receiving the respective videos via the telecommunication network. The invention further relates to a computer program for carrying out the method.

The invention further relates to a transmitter device, to an edge node of the telecommunication network and to a combiner entity. The invention further relates to data structures representing instructions for use in facilitating the video streaming.

BACKGROUND ART

Media content such as video content and audio content is commonly delivered to users in digital form. If media content has a temporal aspect, and in particular is associated with a timeline which indicates how the media content is to be played-out over time, such digital form is typically referred to as a media stream.

In many applications, there may be a number of client devices which each transmit video via a telecommunication network to another client device, which in turn may receive the respective videos via the telecommunication network. For example, in video-based multiuser communication, a client device may function both as a transmitter device by transmitting a live video recording of a user as a video stream to other client devices, and as a receiver device by receiving the video streams of the other client devices. The received video streams may then be decoded and displayed by the client device, for example simultaneously in a video mosaic or as so-called video avatars in a computer-graphics based environment. Another example is a security application, in which a plurality of security cameras each transmit a respective video via a telecommunication network to a receiver device which receives, decodes and displays the videos on a display, for example simultaneously in a video mosaic.

A problem in video streaming in which a receiver device receives the video streams of a plurality of transmitter devices is that it may be challenging for the receiver device to receive and decode multiple video streams simultaneously. For example, lower-end receiver devices such as lower-end smartphones may only have one hardware decoder allowing only one video stream to be hardware decoded. The other streams may be software decoded which is typically computationally (much) more complex. This problem may be aggravated in cases where there are more than two video streams, e.g., one for each of the other participants in a conference call.

In addition, video streams may contain video data which may need to be processed to be used in a particular application. For some applications, such processing of the video data may be computationally complex. For example, in Virtual Reality [VR] or Augmented Reality [AR]-based multiuser communication, a live camera recording of a user may be shown in a computer-graphics based environment, which in AR may be displayed as an overlay over the real physical environment of a user. An example of such an application for Virtual Reality is described by [1].

For example, to make the live camera recording of a user suitable for being shown in the virtual environment, the video may need to be processed, for example to perform so-called background removal, also called foreground/background segmentation, by which the surroundings of the user in the live camera recording are removed or made transparent. Another example is the replacement of a Head-Mounted Display (HMD) worn by a user in the live camera recording by a 3D model of the user's face, possibly including proper eye placement and adjusted facial expressions, see for example [2]. Yet another example is the rotating or otherwise adjusting of a video to compensate for the orientation of the physical camera relative to the captured user not being the same as the orientation of a representation of the live camera recording in the virtual environment to an observer. The latter processing technique is also called free viewpoint or multiple viewpoint rendering or calculation. Such multiple viewpoint rendering or calculation may also be based on multiple camera input, potentially using techniques in the area of 3D image reconstruction.

For security camera videos, it may be desirable to detect objects in the video such as people in general or specific people using facial recognition, and to insert overlays in the video that indicate the detected objects, e.g., using lines or arrows.

These and various other examples of processing of video may be too computationally complex for end-user devices to carry out. For example, the above examples of processing of video may be too complex to be carried out by a device transmitting the live camera recording or a device receiving the live camera recording. Too complex may mean that the performance of the entire device may suffer, e.g., the processing may significantly burden the device and may cause overloads or overheating, it may cause significant battery drain for mobile devices, or it may lead to video playback artefacts such as stuttering, pausing, etc.

It is known to offload video processing to the cloud, e.g., using the resources of one or more network nodes. For example, [3] discusses so-called Network-Based Media Processing (NBMP), which may be used to perform media processing, such as processing of video, in a network or cloud environment.

However, current approaches for using NBMP to offload video processing to the cloud typically introduce additional decoding and encoding operations, since in such current approaches, the video processing typically needs to be performed in the uncompressed domain but the video is sent to the cloud in a compressed format and the processed video typically needs to be encoded again for efficient transmission to a receiver device. Therefore, the network entity performing the NBMP typically has to decode the received video stream, process the decoded video data to obtain processed video, and then again encode the processed video data as a video stream before finally transmitting the video stream to the receiver device.

A disadvantage of the current approaches for using NBMP to offload video processing to the cloud is that the decoding and encoding operations introduce an additional, and typically sizable, delay in the transmission of a video stream to a receiver device. Such additional delays may be undesirable, particularly if the video stream is used in real-time communication. Namely, for optimum communication, a one-way end-to-end delay, e.g., from a transmitter device to a receiver device, is preferably kept below approximately 150 ms, which may not be reachable when having to perform the abovementioned additional decoding and encoding operations, or may require concessions elsewhere, e.g., in encoding quality. Also outside of real-time communication, such delays may be preferably kept to a minimum, e.g., to maintain responsiveness when starting a video stream, switching between video streams, etc.

Accordingly, in a scenario in which multiple transmitter devices transmit respective videos as video streams to a receiver device and in which the videos have to be processed, the decoding of the video streams may significantly add to the computational load of the receiver device, while the processing of the video streams may significantly add to the computational load of the transmitter devices and/or the receiver device, or when using known approaches for using NBMP to offload video processing to the cloud, greatly increase the end-to-end transmission delay.

REFERENCES

[1] M. J. Prins, S. Gunkel and O. Niamut, "*TogetherVR: A Framework for Photo-Realistic Shared Media Experiences in 360-Degree VR*" in International Broadcasting Conference, 2017.

[2] Burgos-Artizzu, X. P., Fleureau, J., Dumas, O., Tapie, T., LeClerc, F., & Mollet, N., "*Real-time expression-sensitive HMD face reconstruction*", in SIGGRAPH Asia 2015 Technical Briefs (p. 9), ACM.

[3] MPEG, ISO/IEC JTC1/SC29/WG11 MPEG2018/N17502, Use cases and requirements for NBMP (v4), April 2018

SUMMARY OF THE INVENTION

It would be advantageous to, in the abovementioned scenario, reduce the computational load of the transmitter devices and/or the receiver device, while at the same time reducing the end-to-end transmission delay compared to the current approaches for using NBMP to offload video processing to the cloud.

The following measures may essentially involve configuring an edge node of a telecommunication network to process the video transmitted by a transmitter device, and transmitting the video from the transmitter device to the edge node using a low latency or ultra-low latency streaming technique. After processing, the processed video may be encoded using a tiled video streaming codec to enable the resulting tiled video stream to be combined with other tiled video streams in a compressed domain, thereby providing the receiver device with a combined tile-based video stream which may be decoded by a single hardware or software decoder of the receiver device.

In accordance with a first aspect of the invention, a system may be provided for facilitating a video streaming which comprises a plurality of transmitter devices each transmitting a respective video via a telecommunication network and a receiver device receiving the respective videos via the telecommunication network, wherein said devices are connected to the telecommunication network via respective access networks. The system may comprise:
 an edge node of the telecommunications network, wherein the edge node may be configured to:
  receive video from at least one of the plurality of transmitter devices as a video stream which may contain the video in uncompressed form or in compressed form as a low latency video stream;
  process the video using one or more processing techniques to obtain processed video;
  encode the processed video as one or more tiles using a tiled video streaming codec to obtain a tile-based video stream;
 a combiner which may be configured to:
  receive the tile-based video stream from the edge node;
  receive at least one other tile-based video stream containing the video transmitted by another transmitter device;
  in a compressed domain, combine the tile-based video stream and the at least one other tile-based video stream to obtain a combined tile-based video stream containing tiles of the videos of at least two transmitter devices.

In accordance with a further aspect of the invention, a computer-implemented method may be provided for facilitating a video streaming which comprises a plurality of transmitter devices each transmitting a respective video via a telecommunication network and a receiver device receiving the respective videos via the telecommunication network, wherein said devices are connected to the telecommunication network via respective access networks. The method may comprise:
 at an edge node of the telecommunications network:
  receiving video from at least one of the plurality of transmitter devices as a video stream which may contain the video in uncompressed form or in compressed form as a low latency video stream;
  processing the video using one or more processing techniques to obtain processed video;
  encoding the processed video as one or more tiles using a tiled video streaming codec to obtain a tile-based video stream;
 at another network entity or edge node or a receiver device:
  receiving the tile-based video stream from the edge node;
  receiving at least one other tile-based video stream containing the video transmitted by another transmitter device;
  in a compressed domain, combining the tile-based video stream and the at least one other tile-based video stream to obtain a combined tile-based video stream containing tiles of the videos of at least two transmitter devices.

In accordance with a further aspect of the invention, a transmitter device may be provided which may be configured for transmitting a video via a telecommunication network, wherein the transmitter device is connected to the telecommunication network via an access network.

The transmitter device may be configured to transmit the video to an edge node of the telecommunications network, wherein the edge node is configured to process the video using one or more processing techniques to obtain processed video and to encode the processed video as one or more tiles using a tiled video streaming codec to obtain a tile-based video stream.

The transmitter device may further be configured to transmit the video to the edge node as a video stream which may contain the video in uncompressed form or in compressed form as a low latency video stream.

In accordance with a further aspect of the invention, an edge node of a telecommunication network may be provided, wherein the edge node may be configured for facilitating a video streaming which comprises a plurality of transmitter devices each transmitting a respective video via a telecommunication network and a receiver device receiving the respective videos via the telecommunication network, wherein said devices are connected to the telecommunication network via respective access networks. The edge node may be configured to:

receive video from a transmitter device as a video stream which may contain the video in uncompressed form or in compressed form as a low latency video stream;
  process the video using one or more processing techniques to obtain processed video; and
  encode the processed video as one or more tiles using a tiled video streaming codec to obtain a tile-based video stream.

In accordance with a further aspect of the invention, a combiner may be provided for facilitating a video streaming which comprises a plurality of transmitter devices each transmitting a respective video via a telecommunication network and a receiver device receiving the respective videos via the telecommunication network, wherein said devices are connected to the telecommunication network via respective access networks. The combiner may be configured to:

receive a tile-based video stream from an edge node, wherein the tile-based video stream may contain video of a transmitter device which is processed by the edge node and encoded by the edge node as one or more tiles using a tiled video streaming codec to obtain the tile-based video stream;
  receive at least one other tile-based video stream containing the video transmitted by another transmitter device; and
  in a compressed domain, combine the tile-based video stream and the at least one other tile-based video stream to obtain a combined tile-based video stream containing tiles of the videos of at least two transmitter devices.

In accordance with a further aspect of the invention, a data structure may be provided representing instructions to a transmitter device to transmit video as a video stream in uncompressed form or in compressed form as a low latency video stream to an edge node of a telecommunication network.

The above measures may be used in the context of two or more transmitter devices transmitting respective videos and a receiver device receiving the respective videos via a telecommunication network, such as a 5G or later generation telecommunication network or the Internet. Each device may be connected to the telecommunication network via an access network, such as in the case of 5G a radio access network or in the case of the Internet a DSL or fiber optic-based access network. The telecommunication network may in some cases also be considered a 'core network' to which client devices are connected via respective access networks.

Instead of streaming the respective videos directly to the receiver device, at least one of the transmitter devices may be configured to stream its video to an edge node of the telecommunication network. For example, such an edge node may be an edge node of a 5G or later generation telecommunication network, or any other type of edge computing system, e.g., located at an edge between the telecommunication network and the access network via which the transmitter device is connected to the telecommunication network. In particular, the edge node may be characterized by its location relative to the transmitter device, in that it may have a low latency and typically high bandwidth connection to the transmitter device. Such edge nodes are known per se, as is the identification of suitable edge nodes for a particular client device which is connected to a telecommunication network via a particular access network.

The transmitter device may obtain the video by video capture, e.g., using a built-in or connected camera. For example, the transmitter device may be a security camera, or a smartphone having a built-in camera, or a PC with a connected webcam. The transmitter device may be configured to, after or during capture of the video, send the video to the edge node in an uncompressed form or in a compressed form as a low latency video stream. The generating of low latency video streams is known per se, and may for example involve using a video encoding technique which does not use backward prediction and therefore does not use backward temporal inter-frame dependencies in the encoding, referring to temporal inter-frame dependencies which for the encoding (and thereby the decoding) of a current frame is dependent on a future frame, e.g., being located further along a content timeline of the video. Examples of such video encoding techniques include, but are not limited to, lossless compression or lossy compression which only uses spatial dependencies or spatiotemporal compression which only uses forward temporal inter-frame dependencies. Such video encoding techniques are known per se. In some embodiments, specifically a low latency or ultra-low latency video encoding technique may be used, which typically also does not use backward prediction to achieve the low or ultra-low latency. Other techniques for obtaining a low latency video stream are known as well and are elucidated elsewhere in the summary and description of this specification.

The edge node may, upon receiving the video stream from the transmitter device, process the video using one or more processing techniques. Such processing techniques may involve computationally complex processing for which it may be desirable to offload the processing from the transmitter device, such as computer vision or machine learning based processing techniques. In a specific example, the processing techniques may perform so-called Head Mounted Device (HMD) removal in camera images acquired of a user wearing an HMD. In general, the processing by the edge node may involve a sequence ('chain') of individual processing techniques, such as image segmentation, object tracking, object recognition, calibration, etc.

Having processed a part of the video, the part may then be encoded by the edge node as one or more so-called 'tiles' using a tiled video streaming codec. Such tiles may subdivide a video frame into logically separate rectangular parts that may be decoded independently when decoding a given frame. For example, HEVC tiles, as described in "An Overview of Tiles in HEVC" by K. Misra et al., IEEE Journal of Selected Topics in Signal Processing, vol. 7, no. 6, pp. 969-977, 2013, as well as similar spatially segmented encodings may not allow spatial prediction across tile boundaries in a frame or may not allow entropy coding dependencies across file boundaries. As such, the tiles may be independent with respect to the encoding and decoding process, in that prediction and filtering may not cross tile boundaries.

Such encoding may be performed on a continuous basis, thereby generating a tile-based video stream which may be streamed by the edge node to another entity, namely a combiner. The combiner may receive the tile-based video stream of the edge node and at least one other tile-based video stream containing video transmitted by another transmitter device, and may then combine the tiles of the at least two video streams in the compressed domain, i.e., without decoding the tiles to obtain uncompressed video, thereby obtaining a combined tile-based video stream now containing the videos of at least two transmitter devices. Such combining in the compressed domain is known per se, for example from the publication "Low complexity cloud-video-mixing using HEVC" from Sanchez, Y. et al., IEEE 11th Consumer Communications and Networking Conference, 2014, and may comprise generating a new bitstream which includes the bitstream data of all tiles and corresponding header information, while re-writing the appropriate parts, e.g., rewriting Video Parameter Sets, Sequence Parameter Sets, Picture Parameter Sets, slice segments headers, etc. For example, as also described in Section III.B of Sanchez et al., in-loop filtering may be disabled, parameter set values may be consistent across input videos, preferably no conformance cropping windows are present, sub-sample vector selection for prediction units should preferably be constrained close to the edge of the input, etc.

The above measures may have the effect that the computational load of the transmitter device may be reduced as the processing of the video may be offloaded to the edge node. At the same time, the transmission delay from transmitter device to receiver device may be reduced compared to the current approaches for using NBMP to offload video processing to the cloud and similar techniques, as the video is purposefully not encoded by the transmitter device, or encoded using a low latency encoding technique, which conversely may mean that the edge node may not have to decode the video stream, or may be able to decode the video stream using a low or minimal latency decoding technique. The video may thus be transmitted from the transmitter device to the edge node with little delay, as the encoding, if any, by the transmitter device is low latency, the connection to the edge node is low latency, and the decoding, if any, by the edge node is low latency. At the same time, the streaming of uncompressed video to the edge node, or video which is compressed while only achieving a sub-optimal compression ratio by having no backward temporal inter-frame dependencies, may be possible as the bandwidth to edge nodes is typically high. In other words, the compression ratio may be low or none as the video is in this form only streamed to the edge node and not further into the telecommunication network. In addition, at the edge node, buffering may be kept to a minimum due to the high bandwidth and vicinity to the transmitter device, which further reduces the overall transmission delay from transmitter device via the edge node to the receiver device, and because the edge does not perform playback so no buffering is needed to ensure availability of frames for smooth playback.

In comparison, current approaches for using NBMP to offload video processing to the cloud NBMP and similar techniques may require a higher compression ratio as the network entity performing the NBMP may be located further into the telecommunication network, e.g., in terms of distance to the access network of the transmitter device, which may impose more bandwidth constraints as the video may have to be transmitted via one or more bandwidth limited network links. Such higher compression ratios may require using backward temporal inter-frame dependencies, which may then greatly increase encoding and decoding latency.

The tile-based encoding of the processed video then enables the tiles of several videos to be combined into a single video stream without having to decode the individual video streams and without having to encode a single video stream from an uncompressed combined video. The tile-based encoding may use backward temporal inter-frame dependencies, and thereby achieve a higher compression ratio than the video stream received by the edge node, which makes it suitable to be transmitted via the telecommunication network to the combiner and the receiver device. The receiver device may then decode the combined video stream using a single decoder instance, e.g., in hardware or software, which may reduce the computational complexity of decoding compared to having to decode several separate video streams.

Effectively, the transmission chain from transmitter device to receiver device may only have one instance of encoding and decoding which uses backward temporal inter-frame dependencies, namely between the edge node and at the receiver device. As the network path between the edge node and the receiver device may be (much) more bandwidth limited than the network path between the transmitter device and the edge node, such higher compression ratio is appropriate here. To still keep the overall delay low, the transmission from transmitter device to edge node omits such higher compression and thereby achieves lower latency at the expense of higher bandwidth, but which is typically available between a transmitter device and its edge node.

Accordingly, the above measures may provide a video streaming which may reduce the computational load of the transmitter devices and/or the receiver device, while at the same time reducing the transmission delay compared to current approaches for using NBMP to offload video processing to the cloud.

In this respect, it is noted that a low latency video stream may be generated in various ways. In general, the low latency may be achieved at the encoder side but also at the decoder side, or jointly at both sides. Techniques providing a low latency video stream include, but are not limited to, using a Gradual Decoder Refresh/Progressive Intra Refresh, using a network bandwidth which is (much) higher than the average stream bandwidth (e.g., between edge node and combiner or between combiner and receiver device), using a higher frame rate compared to an original frame rate of the video, parallelizing the encoding and/or the decoding steps, and/or using faster encoding settings and/or using hardware acceleration (e.g., using a hardware encoder or using GPU processing). Several, for example two or more, of these techniques enabling low latency video streaming may be combined. In general, the term low latency video 'stream' may refer to a video stream which is encoded in a manner that is conventionally understood to obtain a low latency video stream, e.g., in the field of video streaming, and may refer to the latency being lower than that between the edge node and the combiner and/or between the combiner and the receiver device. It will be appreciated that the term 'low latency' also includes 'ultra-low latency'.

In an embodiment, the combiner may be, or may be part of, one of a group of:

an edge node assigned to the receiver device;
a network node in a non-edge part of the telecommunication network between the transmitter device and the receiver device; and
a subsystem of the receiver device.

The combiner may take various forms, such as an edge node of the receiver device, being an edge node which is located in the telecommunication network at an edge to the access network of the receiver device. Another example is that the combiner may be embodied by a network node in a non-edge part of the telecommunication network, for example in a central part of the telecommunication network.

Yet another example is that the combiner may be a subsystem of the receiver device. As such, the receiver device itself may first combine the received tile-based video streams into a combined tile-based video stream, and then decode the combined tile-based video stream using a single decoder instance, e.g., by hardware and/or software.

In an embodiment, the system may comprise multiple combiners which may be mutually arranged in a hierarchical structure such that at least one combiner receives the combined tile-based video stream of at least one other combiner and generates a further combined tile-based video stream which includes the tiles of the received combined tile-based video stream. The combining of tile-based video streams may be performed in a hierarchical manner, in that an output of one combiner may be provided as input to another combiner. Such hierarchical structuring may allow the combining functionality to be distributed over different network nodes, which in turn may allow the combining functionality to be distributed in terms of network location. An advantage of this embodiment may be that while tile-based video streams may originate from different edge nodes and/or access networks, different subsets of the tile-based video streams may already be locally combined when possible, for example when originating from nearby edge nodes, which may reduce the number of ports and connections for streaming the tile-based video streams across the telecommunication network, and/or reduce a need for administration for managing the video streams.

In an embodiment, the multiple combiners may be, or may be part of, at least two different ones of a group of:
   an edge node assigned to the receiver device;
   a network node in a non-edge part of the telecommunication network between the transmitter device and the receiver device; and
   a subsystem of the receiver device.

To enable the combining functionality to be distributed in terms of network location, a number of different types of combiners may be used, including but not limited to the aforementioned implementation types. For example, a central network node may combine a first subset of tile-based video streams into a first combined tile-based video stream, while the edge node of the receiver device may combine the first combined tile-based video stream which two other tile-based video streams to obtain a second combined tile-based video stream for streaming to the receiver device.

In an embodiment, the system may further comprise an orchestration node which may be configured to orchestrate the processing of the video by the edge node by transmitting instructions to the transmitter device and/or the edge node. Such an orchestration node may centrally control at least part of the video streaming by transmitting instructions to the transmitter device and/or the edge node. For example, the orchestration node may be embodied by an application server which centrally controls a video streaming which is taking place within the context of an application.

In an embodiment, the orchestration node may be configured to assign the edge node to the transmitter device by informing the transmitter device of a network identifier of the edge node. In some examples, the orchestration node may effectively instruct the transmitter device to transmit the video to the edge node in uncompressed or in compressed form as a low latency video stream. The providing of these instructions may comprise or consist of the orchestration node informing the transmitter device of the network identifier of the edge node.

In an embodiment, the orchestration node may be configured to generate instructions for the edge node containing at least one of:
   a selection or configuration of the one or more processing techniques;
   a configuration for the encoding of the one or more tiles; and
   a network identifier of the combiner.

In an embodiment, the transmitter device may be configured to switch between a) transmitting the video stream in uncompressed or in compressed form as a low latency video stream to the edge node for processing, and b) processing the video and transmitting the video stream in compressed form with backward prediction, wherein said switching may be based on at least one of a group of:
   an instruction received from another entity;
   an availability of computing resources in the transmitter device;
   an availability of network resources available for streaming; and
   a battery level of the transmitter device.

The transmitter device may thus switch between a 'normal' streaming mode in which transmitter device processes the video, e.g., if sufficient local computing resources are available and/or the battery level is at a sufficient level, and subsequently encodes the video stream with backward temporal inter-frame dependencies, and a latency-reduced streaming mode in which the video stream is not compressed or compressed as a low latency video stream and transmitted to the edge node to 'offload' the processing to the edge node.

In an embodiment, the transmitter device may be configured to generate instructions for the edge node containing at least one of:
   a selection or configuration of the one or more processing techniques;
   a configuration for the encoding of the one or more tiles; and
   a network identifier of a combiner to which the tile-based video stream is to be transmitted to be combined in the compressed domain with one or more other tile-based video streams.

In an embodiment, a data structure may be provided representing instructions to an edge node of a telecommunication network, wherein the instructions may contain at least one of:
   a selection or configuration of one or more processing techniques to be applied to a video which is received from a transmitter device;
   a configuration for encoding said processed video as one or more tiles using a tiled video streaming codec to obtain a tile-based video stream; and
   a network identifier of a combiner to which the tile-based video stream is to be transmitted to be combined in a compressed domain with one or more other tile-based video streams.

In a further aspect of the invention, a transitory or non-transitory computer-readable medium may be provided comprising a computer program which program may comprise instructions for causing a processor system to perform the method.

It will be appreciated by those skilled in the art that two or more of the above-mentioned embodiments, implementations, and/or aspects of the invention may be combined in any way deemed useful.

Modifications and variations of any computer-implemented method, system, device, network node and/or computer-readable medium, which correspond to the modifications and variations described for another one of said entities, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

FIGS. 14A-14K show the end-to-end delay in various scenarios;

Figure 1:
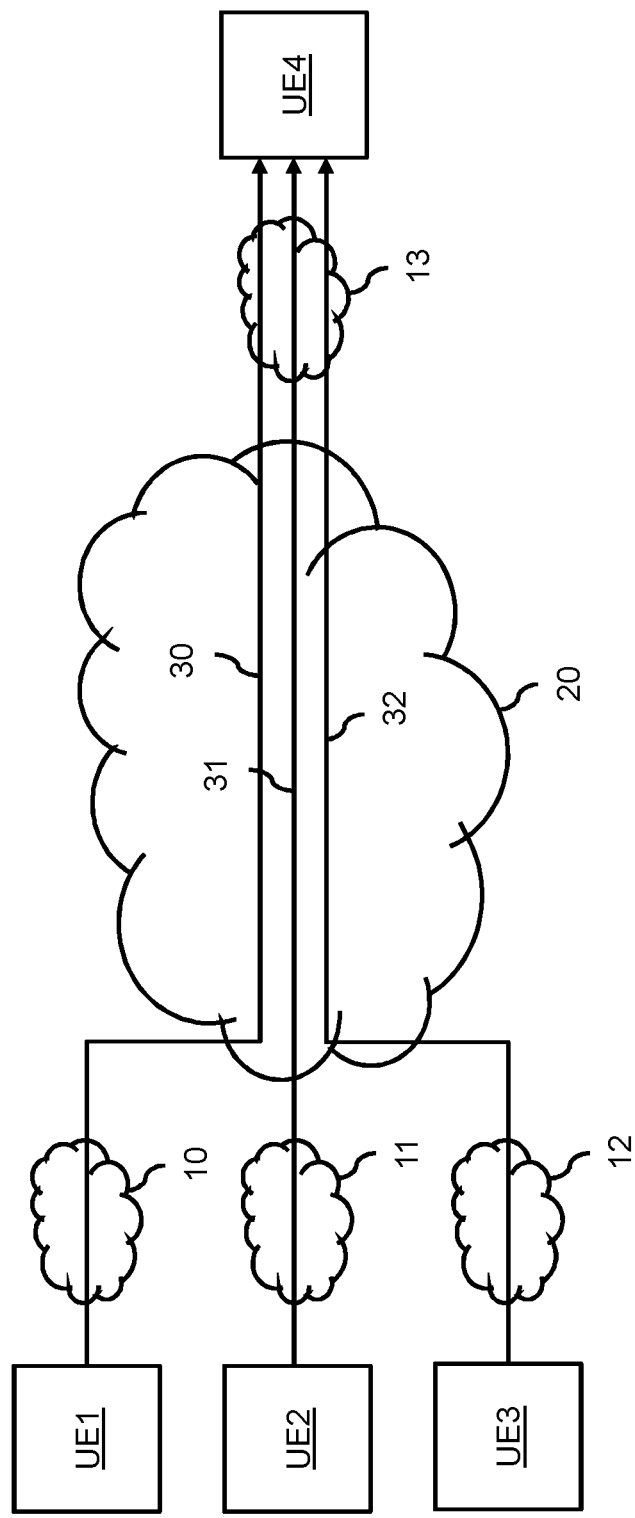
FIG. 1 shows a plurality of transmitter devices each transmitting a respective video via a telecommunication network and a receiver device receiving the respective videos via the telecommunication network, with said devices being connected to the telecommunication network via respective access networks.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

AS Application Server
ENX Edge Node X
HMD Head Mounted Display
MRF Media Resource Function
NNN Non-edge Network Node
ON Orchestration Node
UEX User Equipment X
10-13 access network
20 telecommunication network
30-32 video stream
40 (ultra) low latency video stream
50-53 tiled video stream
60 combined tiled video stream
70 combiner in compressed domain
80 combiner in uncompressed domain
90-93 orchestration instruction
100 capture
110 encode
130 process
140 tile/encode
150 combine (in compressed domain)
152 combine (in uncompressed domain)
160 encode
170 decode
180 split/render
200 captured video frame
210 head mounted display
220 rendered part of 3D model of user
250 video frame after head mounted display removal
300 session control
310 scene configuration
312, 314 session signaling
316 scene configuration
318 media control
320 media processing
322, 324 metadata
326, 328 media
400 processor system
420 network interface
422 network communication data
440 processor subsystem
460 data storage
500 processor system configured as receiver device
520 network interface
522 network communication data
540 processor subsystem
560 display output
562 display data
580 display
600 method for facilitating video streaming
610 receiving video
620 processing video 630 encoding video to obtain tile-based video
640 receiving tile-based video
650 receiving further tile-based video
660 combining tile-based videos
700 computer-readable medium
710 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

Some of the following embodiments are described within the context of 'Social VR' where a number of users participate in a teleconference using HMDs and cameras and in which it may be desirable to process a video containing a live camera recording of a user to make the video suitable for being shown in the virtual environment, for example by background removal or the replacement of an HMD by a 3D model of the user's face. However, the techniques described in the following embodiments may also be used in any other context in which a plurality of transmitter devices each transmit a respective video via a telecommunication network and a receiver device receives the respective videos via the telecommunication network, for example in any non-VR type of video conferencing application, in security applications involving the deployment of multiple security cameras or in live event registration in which multiple cameras are used to capture different viewpoints of an event. In any such cases or other cases, there may be a requirement that the end-to-end streaming of the video is carried out with low latency, even while processing the video images.

It is further noted that in the following, any reference to a 'video stream' may refer to a data representation of a video which is suitable for being streamed, e.g., using known streaming techniques. Furthermore, a reference to a 'video' may include a video stream but also a data representation of the video which is not (yet) suitable for being streamed or at least conventionally not intended for streaming. In the Figures, video (streams) may be schematically represented by a single video frame.

FIG. 1 shows a plurality of transmitter devices UE1-UE3 each transmitting a respective video via a telecommunication network 20 in a streaming manner (which is elsewhere also simply referred to as 'streaming'). Such streaming is indicated in FIG. 1 by arrows 30-32. FIG. 1 further shows a receiver device UE4 receiving the respective videos 30-32 via the telecommunication network 20. Each of the devices UE1-UE4 is shown to be connected to the telecommunication network 20 via a respective access network 10-13. In the example of FIG. 1, the telecommunication network 20 may be a 5G or later generation telecommunication network to which the devices, being here 'User Equipment' (UE), are connected via respective radio access networks 10-13. In other examples, the telecommunication network 20 may be the Internet, and the access networks 10-13 may be DSL or fiberoptic-based access networks. Various other examples of telecommunication networks and access networks exist as well.

Although not shown in FIG. 1, in some embodiments, each transmitter device may also be a receiver device and vice versa, in that each device may receive the videos of the other devices and transmit its own video to the other devices. This may for example be the case in video conferencing. In other embodiments, some of the transmitter devices may also be receiver devices and/or vice versa. In other embodiments, transmitter devices may only transmit video and do not receive video while receiver devices may only receive video and do not transmit video.

There may be a need to process videos of transmitter devices.

Figure 2A:
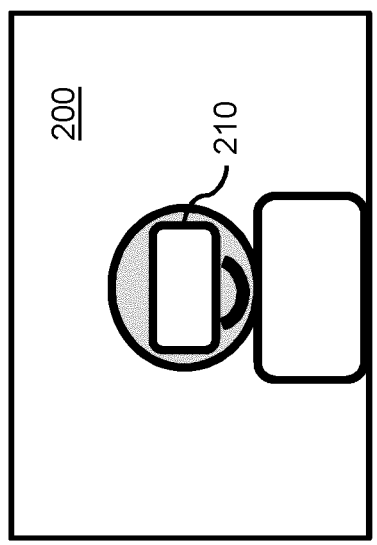
FIGS. 2A-2C illustrate a processing of a video in the form of so-called Head Mounted Display (HMD) removal, in which the HMD may be detected in a captured video frame and replaced by a corresponding rendered part of a 3D model of a user.
Figure 2B:
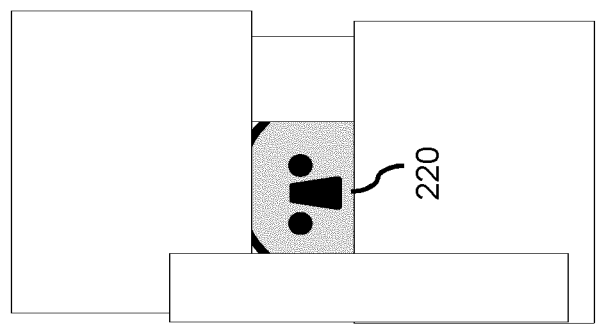
Figure 2C:
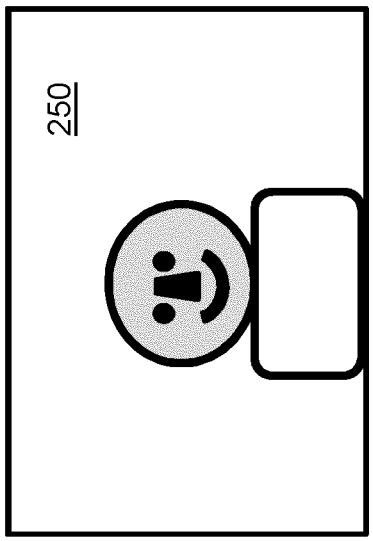

FIGS. 2A-2C show a specific type of processing a video in the form of so-called Head Mounted Display (HMD) removal, which may be used to detect the HMD in a video captured of a user during a Social VR session and to replace the HMD by a corresponding rendered part of a 3D model of the user. Such HMD removal is known per se, and may assume a 3D model of the user's face to be available or generatable, e.g., as an UV projection. A relevant part of the user's face may be selected from the user's 3D model, appropriately sized, adjusted for color and lighting differences between the model and the video frame, and then overlaid over the detected HMD.

A simplified procedure is shown in FIGS. 2A-2C for a front facing user. Firstly, the HMD 210 may be detected in a video frame 200 (FIG. 2A), e.g., in the form of a position and orientation of the HMD. The purpose of such a detection may be to detect the part of the user's face, including its orientation, which is occluded by the HMD 210 and which may be replaced by an image part generated from the 3D model. Based on the position and orientation of the HMD, a relevant part of the 3D model may be selected, which may be rendered from a desired perspective as an image part 220 (FIG. 2B) showing the part of the face to be overlaid over the video frame. The image part 220 may be overlaid to obtain a 'HMD-removed' video frame 250 (FIG. 2C). Alternatively or additionally, other kinds of processing are possible, including foreground/background segmentation, object detection, object annotation, object insertion, object transformation, object replacement, 3D reconstruction, etc.

Figure 3:
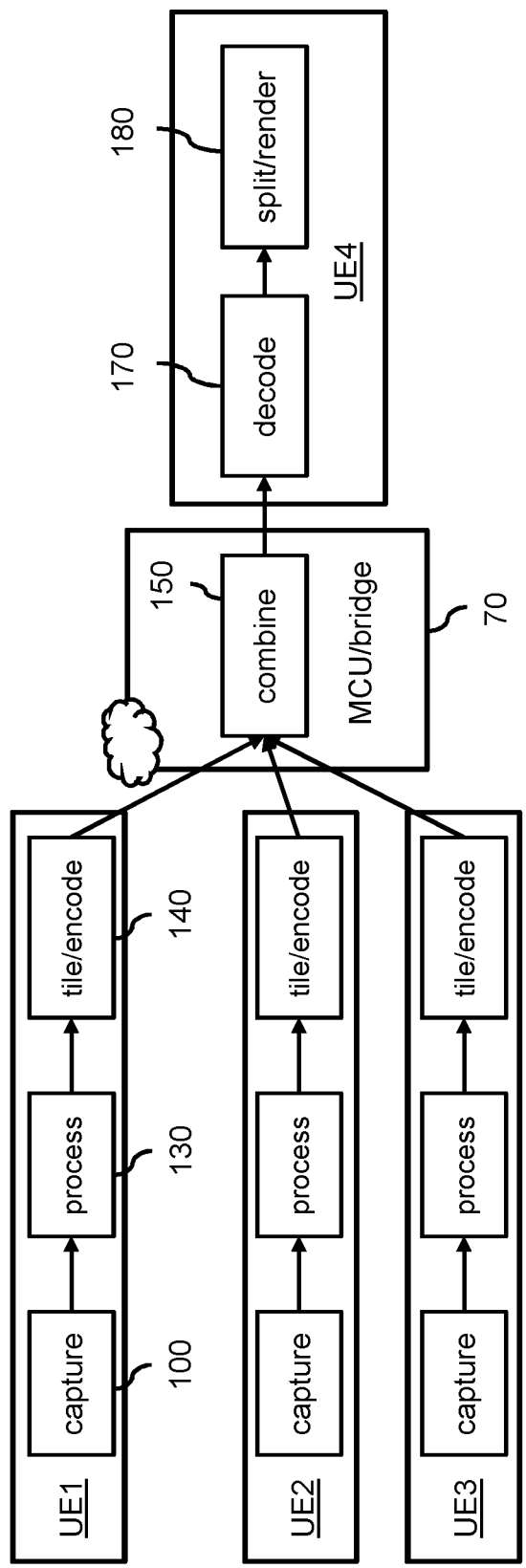
FIG. 3 shows a plurality of transmitter devices each capturing, processing and in a tiled manner encoding the video to obtain respective tile-based video streams, a combiner in the telecommunication network combining the tile-based video streams in the compressed domain to obtain a combined tile-based video stream, and a receiver device receiving and decoding the combined tile-based video stream.

FIG. 3 shows how such processing of the video may be incorporated into a video streaming from transmitter devices to a receiver device, in that it shows a plurality of transmitter devices UE1-UE3 each capturing 100, processing 130 and in a tiled manner encoding 140 the video to obtain respective tile-based video streams. Here, the term 'encoding a tiled manner' may refer to encoding the video in such a way that it is suitable for use as a tile in a larger configuration of tiles. Such tile-based video encoding is known per se, e.g., from HEVC tiled streaming, and may allow a combiner 70 in the telecommunication network to combine 150 the tile-based video streams in the compressed domain to obtain a combined tile-based video stream. The combined tile-based video stream may then be transmitted by the combiner 70 to a receiver device UE4 which may receive and decode 170 the combined tile-based video stream, after which the videos may be rendered 180.

Such rendering is here and elsewhere also referred to as 'split/render', referring to the fact that the videos may be split into individual parts again, e.g., to allow various compositions in the rendered output such as placing the videos as avatars in a graphics-based environment. In the FIG. 3 example, the combiner 70 is shown to be a cloud-based server which is symbolically indicated in FIG. 3 by a cloud symbol, and which may in general be any suitably configured network node or combination of physical nodes used together for this purpose, typically referred to as 'cloud'. Examples of such network nodes include, but are not limited to, Multipoint Control Units (MCUs) and video conferencing bridges and, in the case of VR-based teleconferencing, VR bridges, with the type of server depending on the technical and application-specific context.

By performing the combining 150 in the compressed domain, the end-to-end delay in the FIG. 3 example may be kept to a minimum by having only one encoding 140 and one decoding 170 operation in the transmission chain from each transmitter device UE1-UE3 to the receiver device UE4. In addition, the computational load on the receiver device UE4 may be reduced by having only to decode one combined tile-based video stream, instead of several (non-tiled) video streams.

However, there remain problems in the FIG. 3 example. Firstly, the processing 130 may represent a too severe computational load for the respective transmitter devices UE1-UE3. For example, in case of HMD removal, the computer vision-based processing techniques may be computationally expensive, which may cause a significant drain on the computing resources of the transmitter device, and/or cause excess battery drain in case the transmitter device is a mobile device. Moreover, the tile-based encoding may also be computationally complex, e.g., requiring real-time spatiotemporal analysis of the video data to detect spatiotemporal data correlation.

Figure 4:
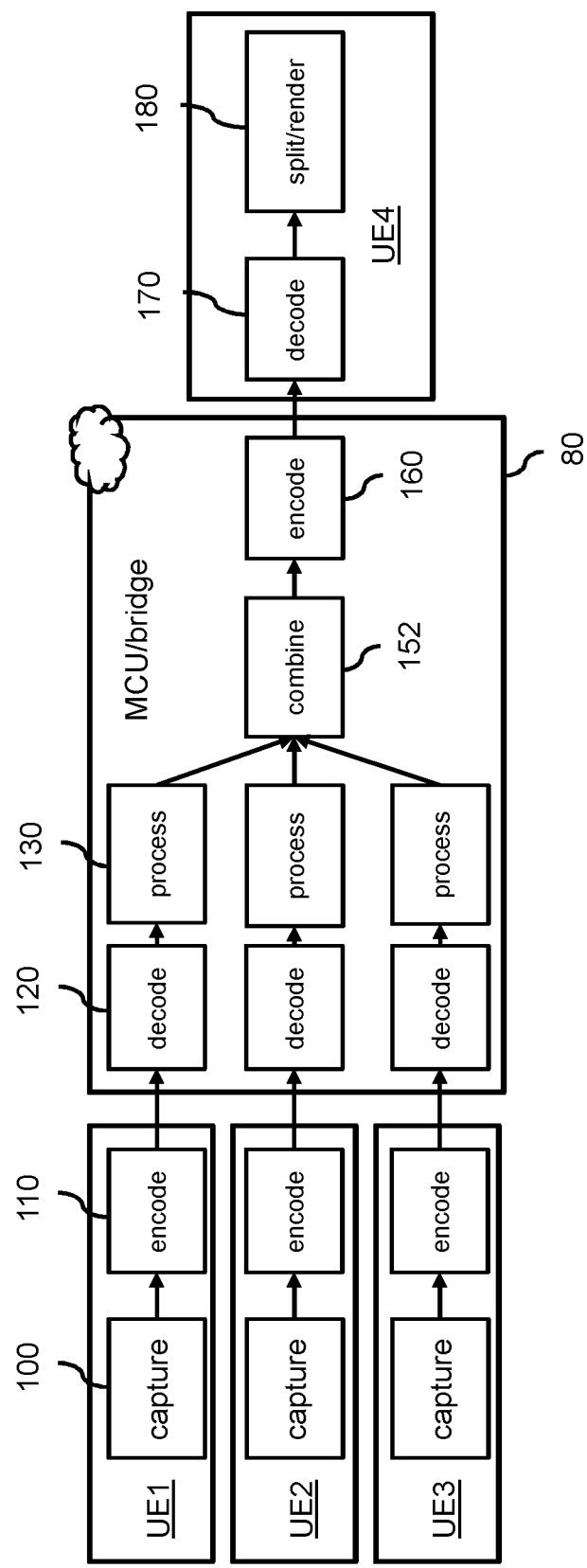
FIG. 4 is similar to FIG. 3 but shows the processing being performed by the combiner in the telecommunication network rather than by the transmitter devices.

FIG. 4 is similar to FIG. 3 but shows the processing being performed by the combiner in the telecommunication network rather than by the transmitter devices UE1-UE3. Namely, the combiner 80 is shown to process 130 each video and then combine 152 the processed videos in the uncompressed domain. However, as the combiner 150 is typically located at a distance from the devices UE1-UE4, e.g., when implemented by a cloud-based server, the bandwidth to and from the devices UE1-UE4 may be limited, which may require spatiotemporal compression to be applied, e.g., with forward and backward temporal dependencies. As a result, each transmitter device UE1-UE3 may have to encode 110 the video before transmission to the combiner 80, the combiner 80 may have to decode 120 each received video and after processing and combining the processed videos encode 160 the combined video, while finally the receiver device UE4 may have to decode 170 the video and split/render 180 the decoded video. It is noted that tiling may not be needed in such an example. However, the overall video streaming shown in FIG. 4 may result in an end-to-end delay which may be too large in many application areas. For example, for communication purposes, delays in video streaming may need to be kept to a minimum, preferably below 500 or even 150 ms.

The following embodiments implement the processing and combining of the videos at specific places in the end-to-end video distribution chain to achieve a low end-to-end delay and to offload the video processing, in terms of being computationally expensive processing such as HMD removal, from the transmitter devices.

Figure 5:
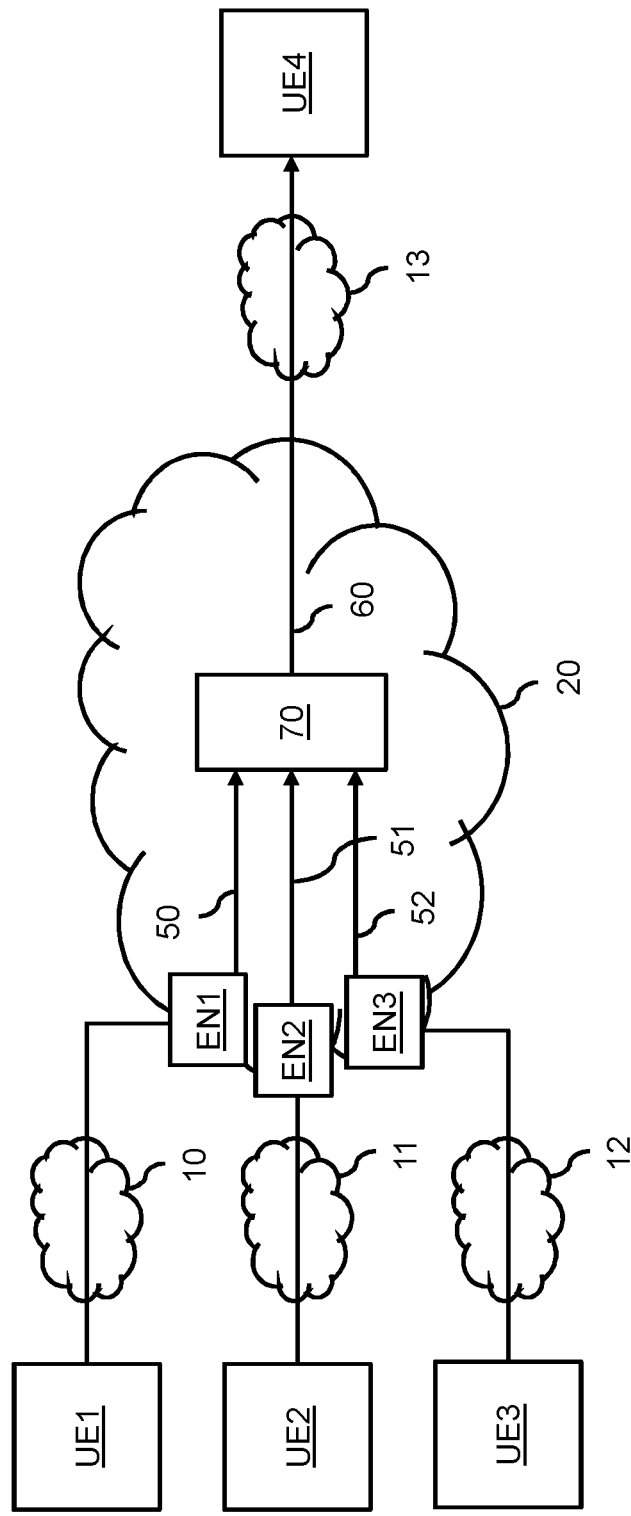
FIG. 5 shows an embodiment in which a plurality of transmitter devices each transmit a captured video to a respective edge node of the telecommunication network which processes and encodes the video using a tiled video streaming codec to obtain a tile-based video stream, and a combiner combining the tile-based video streams to obtain a combined-tile-based video stream which is transmitted to a receiver device.

FIG. 5 shows an embodiment in which a plurality of transmitter devices UE1-UE3 each transmit a captured video to a respective edge node EN1-EN3 of the telecommunication network 20 which processes and encodes the video using a tiled video streaming codec to obtain respective tile-based video streams 50-52, and in which a combiner 70 combines the tile-based video streams to obtain a combined-tile-based video stream 60 which is transmitted to a receiver device UE4. In this embodiment, so-called edge nodes are used to process the videos. Such edge nodes exist in various network types and architectures, and may generally be located at an edge of the telecommunication network 20 to respective access nodes 10-12 via which the transmitter devices UE1-UE3 are connected to the telecommunication network 20.

For example, such edge nodes are known from the field of edge computing, in which cloud computing resources may be placed close to the edge of the telecommunication network. This placement may have different benefits. For example, it may allow for a low-delay connection between a respective device and the cloud computing resources. Another example is that such placement may offload traffic from the core of the telecommunication network. Using edge computing for video processing is known per se, for example from live TV production scenarios in which the video processing is moved from a TV truck in the parking lot to an edge computing platform. In such examples, raw video footage may be sent to the edge computing platform, where the raw video is processed before being streamed as a TV-ready video stream.

The FIG. 5 and following embodiments may offload the processing of the video to the telecommunication network, and specifically to edge nodes of the telecommunication network. To send the video from the transmitter device to the edge node, a low latency video transmission technique may be used, as the connection to the edge node typically has low latency and high bandwidth and thus low jitter (referring to the latency variation between packets). This may also avoid a need for large buffering at the edge node, which may otherwise be needed if the jitter were to be high and which may introduce additional delay. Such buffering may also not be needed for the video processing performed by the edge nodes, as such video processing may typically involve video frames being processed as they arrive at the edge node, e.g., there may no need for play-out at the edge that has to be continuous/smooth.

The transmission of the video from the transmitter device to the edge node may therefore achieve lower latency at the expense of higher bandwidth, for example by sending the video in uncompressed form or using lossless compression or lossy compression which only uses spatial dependencies or spatiotemporal compression which only uses forward temporal inter-frame dependencies. Such compression techniques are known per se. In general, the video coding technique and associated video streaming codec may be a low latency or ultra-low latency video coding technique or codec. In contrast, the latency introduced by the tile-based video streaming codec may be (much) higher, for example due to using forward and backward temporal inter-frame dependencies. The difference in latency introduced by the respective video coding techniques may for example be at least 1:2, 1:5 or 1:10 (delay caused by encoding and decoding by transmitter device and edge node, versus encoding and decoding by edge node and receiver device, respectively). Typically, a 'regular' real-time video transmission will have a delay in the order of magnitude of 200 to 300 ms up to 500 ms, where the delay may consist of capture delays depending on the frame rate, of encoding delays due to temporal dependencies in encoding, of transmission and queueing delays in the network, of buffering in the receiver devices, and of decoding and display delays, etc. For low-latency streaming, typically the main differences with 'regular' video streaming will be in encoding, where future dependencies during encoding are avoided at the cost of higher bandwidth, i.e., less compression, and in minimizing the buffering at the receiving end. Buffering cannot be completely avoided in case of play-out at the receiving end, as buffer underruns may interrupt smooth play-out. A low latency or ultra-low latency video stream may thus have an end-to-end delay of about 100 ms or even lower.

Figure 6:
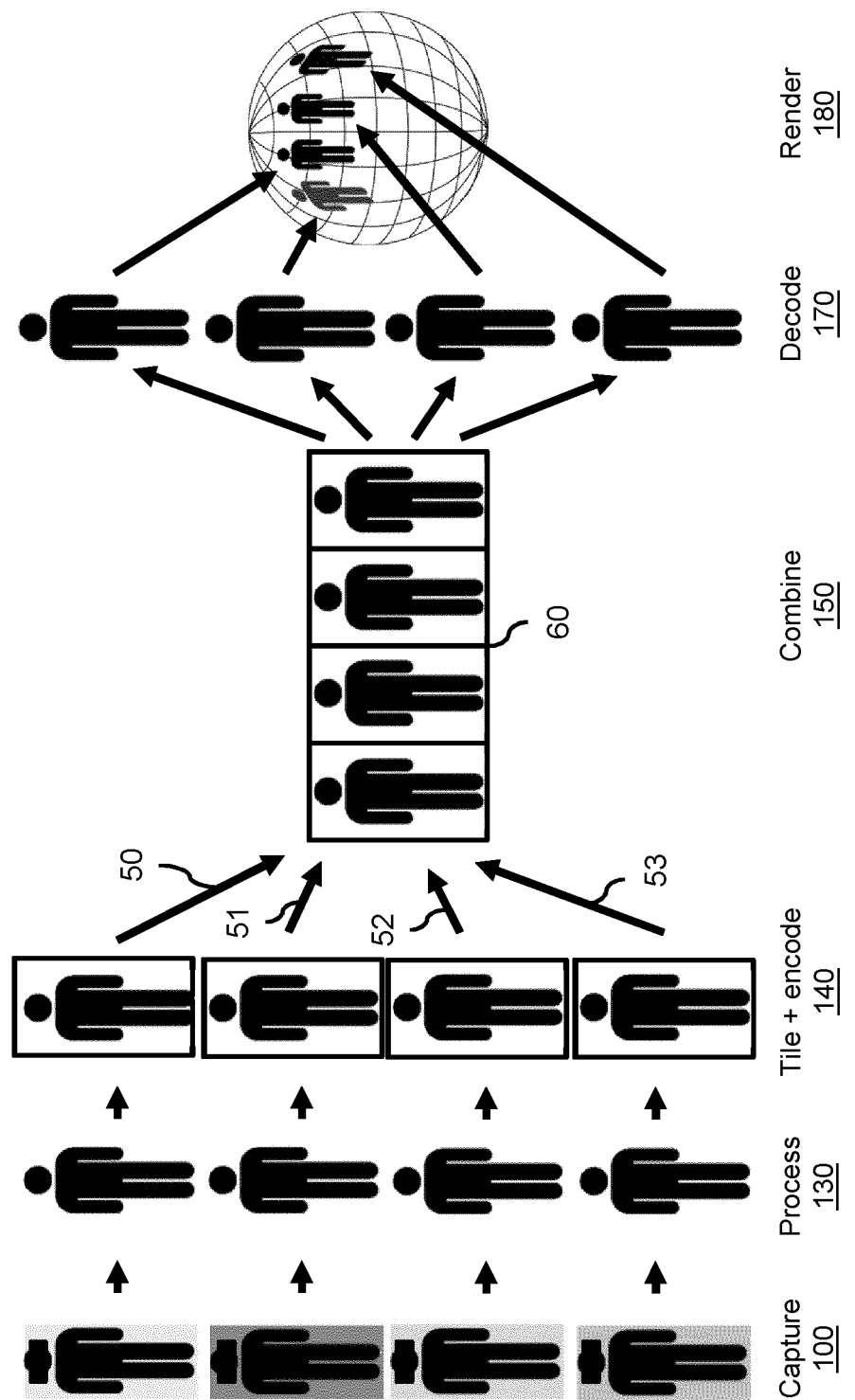
FIG. 6 visually illustrates the FIG. 5 embodiment by showing a content of the videos, the encoding as tiles, the combining of several tiles, the decoding and rendering.

FIG. 6 visually illustrates the FIG. 5 embodiment for a social VR use-case in which the video of several participants may be captured 100. As can be seen in FIG. 6, the captured video frame may include the participant wearing an HMD, which may then be removed, along with the background of the participants, by video processing 130 in respective edge nodes. The processed videos may then be tiled and encoded 140 by the edge nodes, and sent as separate tile-based video streams 50-53 to a combiner which combines 150 the tiles in the compressed domain to obtain a combined tile-based video stream 60, which may then be transmitted by the combiner to a receiver device where it may be decoded 170 and split to obtain separate videos of the participants, which may finally be rendered 180, e.g., as video avatars in a computer-based environment. It will be appreciated that, although not explicitly shown in FIG. 6, the processing 130 may take place on the edge nodes EN1-EN3 of FIG. 5, while the combining 150 may take place in a combiner which may be a separate entity, possibly even on the receiver device.

It will be appreciated that the video avatars shown in FIG. 6 may be used as representation for the other participants, but may also be used for a self-representation, e.g., as a self-view. A self-view typically requires a very low delay to ensure that the proprioceptive perception of the body matches the user's vision of his/her own body. By inserting the self-view as a tile on the edge, and streaming the resulting tiled video stream to the combiner but also back to the transmitter device, the delays involved in generating the self-view may be kept to a minimum. In some embodiments, the processed video may be sent to the combiner as a tiled-video stream as well as to the transmitter device using a non-tiled (ultra-)low latency video coding technique. The latter may include known techniques but also newly developed techniques, such as those described as part of H.266/VVC (Versatile Video Coding), being the successor of H.265/HEVC. Herein, the tiling concept is being improved and also tiles with different configurations are allowed in a single video stream. This will likely also allow certain tiles to have a higher frame rate or a lower latency compared to other tiles. This may allow for a self-view, created by an edge node and directly transmitted back to the user equipment, to be transmitted as a low-latency tile together with other more regular tiles, e.g., containing the video images of other participants in a conference.

Figure 7:
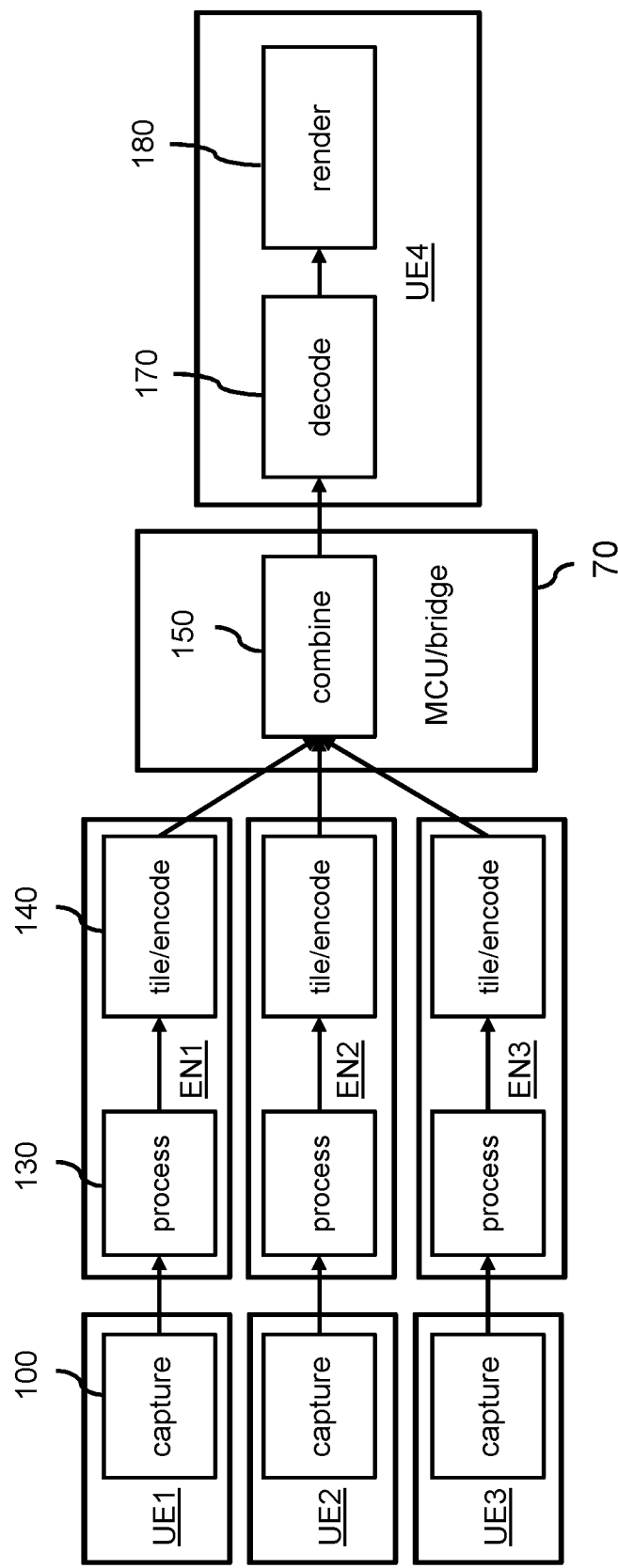
FIG. 7 provides a different schematic view of the FIG. 5 embodiment.

FIG. 7 provides a different schematic view of the FIG. 5 embodiment indicating the location of the various functions from capture to render. Namely, each transmitter device UE1-UE3 is shown to perform a capture 100, after which the captured video is sent directly to a respective edge node EN1-EN3. It is noted that such edge nodes may be different edge nodes, e.g., due to the difference in location between the transmitter devices, but may also comprise edge nodes which are the same, e.g., 'shared', between several transmitter devices. The 'direct transmission' may involve the aforementioned lack of compression, or use of a low latency or ultra-low latency video coding technique. As this incurs relatively little delay, the encoding and decoding between a respective transmitter device UE1-UE3 and a respective edge node EN1-EN3 is not shown. Each edge node EN1-EN3 may then process 130 the respective video and encode 140 the processed video using a tile-based video streaming codec, after which the tiled—based video streams may be sent to a combiner 70 which combines the tiles of the tile-based video streams into a combined tile-based video stream in the compressed domain, which may finally be transmitted to the receiver device UE4 which may then decode 170 and render 180 the videos.

Figure 8:
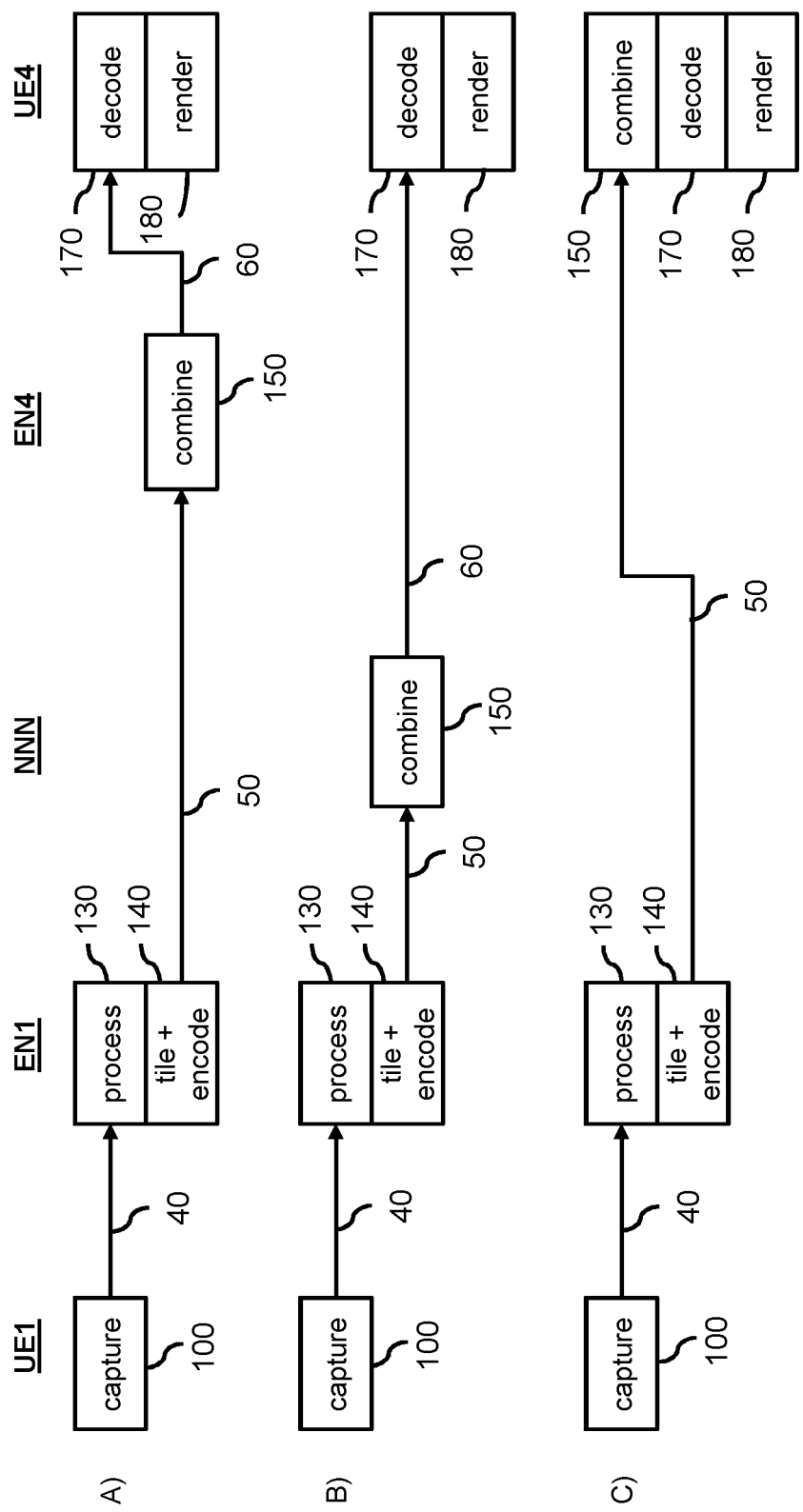
FIG. 8 illustrates different embodiments of the combiner, being either part of a central cloud, or embodied by an edge node, or integrated into a receiver device.

FIG. 8 illustrates different embodiments of the combiner function 150 in the context of a transmission chain from a transmitter device UE1 via an edge node EN1 and a combiner to a receiver device UE4. In all embodiments, the transmitter device UE1 may capture 100 video which may then be streamed as a low latency or ultra-low latency video stream 40 to the edge node EN1, which may process 130 the video and encode 140 the processed video using a tile-based video streaming codec, after which the tiled-video stream 50 may be sent to a combiner which combines 150 the tile-based video stream 50 with other tile-based video streams (not shown) to obtain a combined tile-based video stream 60 which may be decoded 170 by the receiver device UE4 and then rendered 180, e.g., on a display such as an HMD (also not shown in FIG. 8).

Here, embodiments A)-C) relate to different embodiments of the combiner. Namely, in embodiment A), an edge node EN4 is shown to implement the combine function 150. The edge node EN4 may for example be an edge node assigned to the receiver device UE4 and/or may be located in a vicinity of the receiver device UE4. In embodiment B), a non-edge network node NNN located in a non-edge part of the network is shown to implement the combine function 150, while in embodiment C), the receiver device UE4 itself is shown to implement the combine function 150.

It is noted that while the edge node EN1 may have no or only a limited jitter buffer for processing the video, as also explained elsewhere, the combine function 150 may have a jitter buffer as the tile-based video streams may have to be combined in a synchronized manner, meaning that for creating a combined frame combining the inputs of different UEs, a video frame for each of these UEs may be needed. As an alternative to more buffering, if one UE's input is lagging, frames may be left out or duplicated, and if lag decreases frames may be skipped again. As such, in the transmission chain of FIG. 8, one substantial jitter buffer may suffice, namely in the combiner. In this respect, it may be particularly advantageous to locate the combiner in an edge node (embodiment A) or in the receiver device (embodiment C), as in these cases little or no further receiver buffering is needed.

Figure 9:
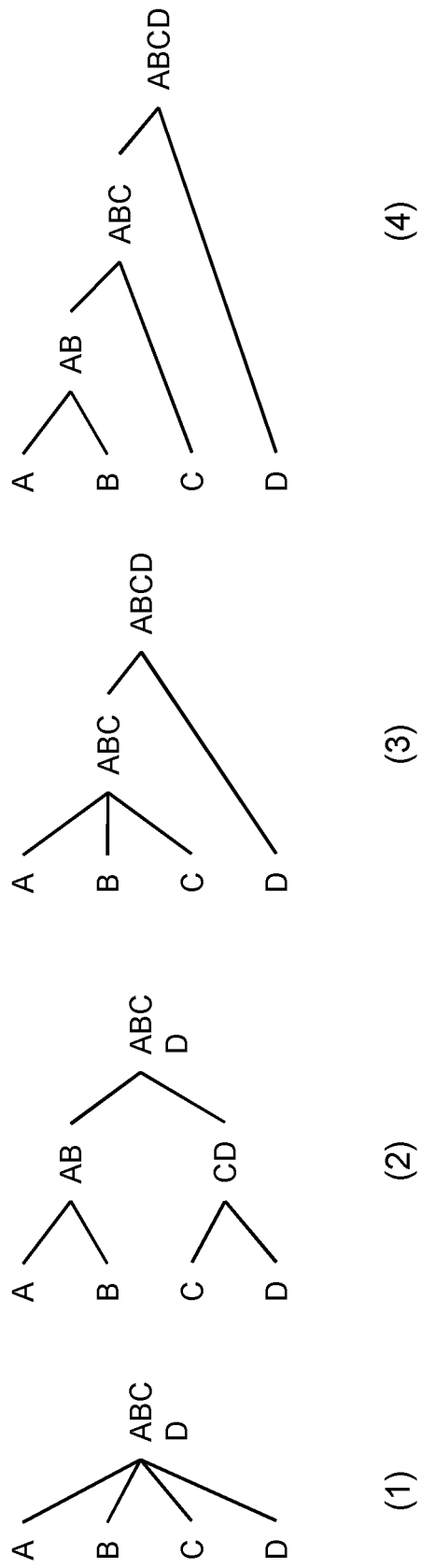
FIG. 9 shows various options to hierarchically combine tiled video streams.

FIG. 9 shows various options to hierarchically combine tiled video streams. Namely, while FIG. 8 only shows a single combine function 150, the combining may also be performed in a hierarchical manner, in that there may be multiple combiners which may be mutually arranged in a hierarchical structure such that at least one combiner receives the combined tile-based video stream of at least one other combiner and generates a further combined tile-based video stream which includes the tiles of the received combined tile-based video stream. In FIG. 9, such different tile-based video streams may be referred to as input (or users) A, B, C, D, while combined tile-based video streams may be referred to outputs of combinations of letters, e.g., AB.

Option (1) shows all inputs (A, B, C and D) being sent to one combiner, which combines the inputs into a single output ABCD. This may be considered a classic MCU model of a single, central conferencing bridge. This model may also be used when the receiver device functions as combiner. In this case, all inputs may be received directly from edge nodes and/or transmitter devices and may be locally combined into a single tile-based video stream. Even such local combining may be advantageous, for example if hardware support is used for the decoding, as typically such hardware support is limited to the decoding of a single video stream.

Option (2) shows user inputs being grouped, as may be the case if 2 users A, B are near each other and 2 other users C, D are also near each other. Near each other may mean they are for example colleagues working in the same building, or are otherwise physically close to each other. Nearby network nodes, such as servers, cloud servers, edge cloud servers, media aware network elements, etc., may combine two inputs into a single output stream, while later another network entity or the receiver device may combine the two combined streams (A, B) and (C, D) into a single stream. This may be advantageous for streaming, as a single video stream may require less complexity to stream than multiple video streams, e.g. fewer ports and connections may be needed for streaming, less administration needed for managing the streaming and the streaming sessions, for taking potential QoS measures such as bandwidth reservations, etc.

Option (3) shows a number of inputs being first combined, while later another input is added. An example of the latter may be the insertion of a self-view. The inputs of various other users A, B, C may be first combined into a single tile-based video stream, while later the self-view D may be added. This may be the case when a network node, e.g. an edge node, is generating a self-view tile-based video stream from a captured self-view video which is transmitted by the transmitter device to the edge node and then transmitted back from the edge node to the transmitter device.

Option (4) shows various inputs being added one by one. This may be used when tile-based video streams are combined whenever they meet in the network.

Figure 10:
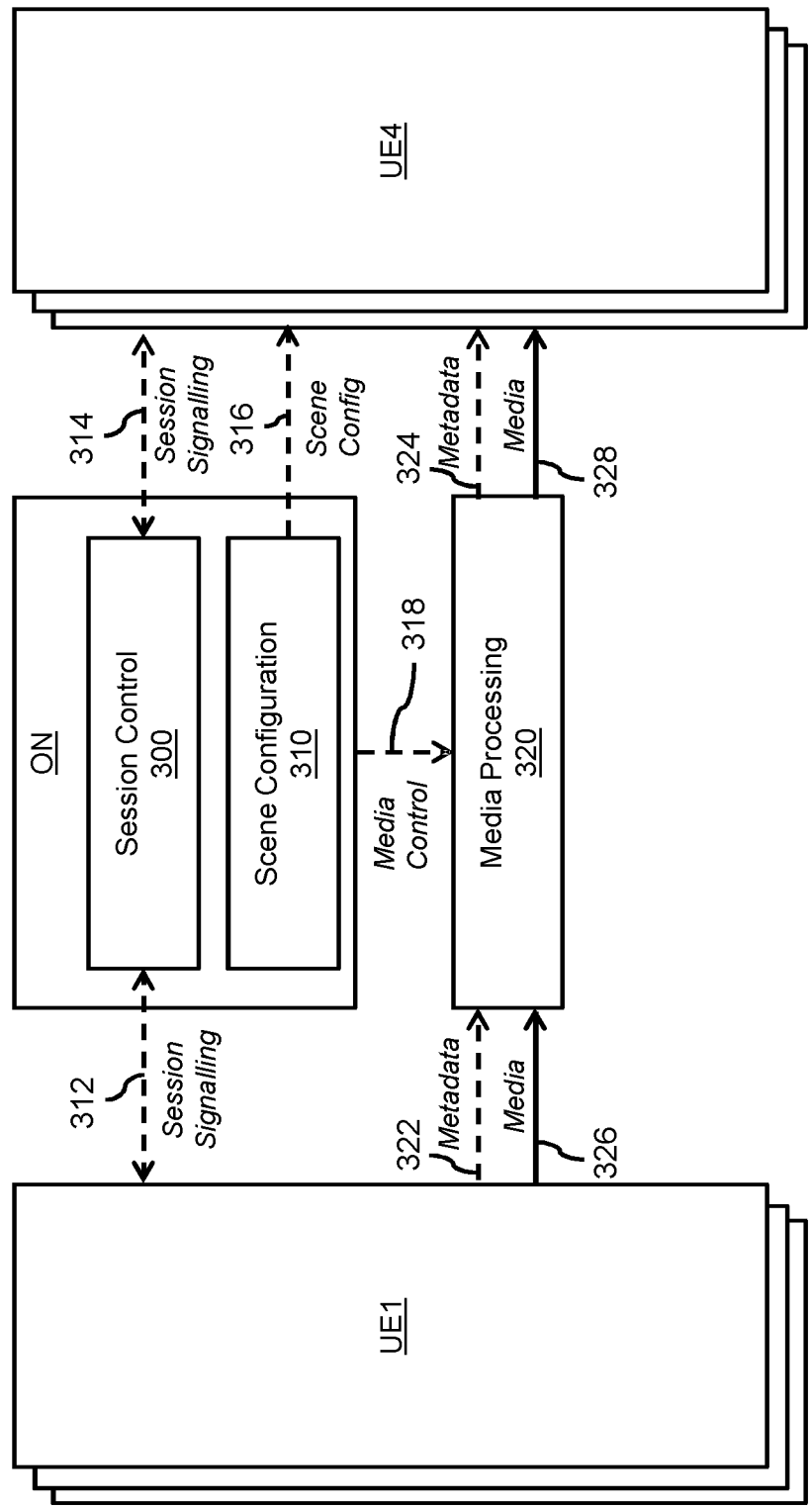
FIG. 10 shows an orchestration node for orchestrating the video streaming.

In some embodiments, the video streaming from a transmitter device via an edge node and a combiner to a receiver device may be centrally orchestrated by a network entity, which is here and elsewhere referred to as an orchestration node. An example of the functional architecture of such an orchestration node is shown in FIG. 10, in which the orchestration node ON is shown to exchange session signaling information 312, 314 with a transmitter device UE1 and a receiver device UE4 on the basis of a session control function 300. In the example of FIG. 10, the orchestration node may be a social VR server for orchestrating a social VR communication session [1], and is therefore further shown to provide scene configuration information 316 to the receiver device UE4 on the basis of a scene configuration 310. Further shown in FIG. 10 is the transmitter device UE1 sending media 326 and metadata 322, e.g., the captured video and associated metadata, which may be processed by media processing 320 resulting in media 328 and metadata 324. In some embodiments, the media processing 320 may represent the edge node processing and the combining of the video streams. As such, the media 328 may represent a combined tile-based video stream. To orchestrate the media processing 320, the orchestration node ON may provide media control data 318, which are elsewhere also referred to as instructions.

Figure 11:
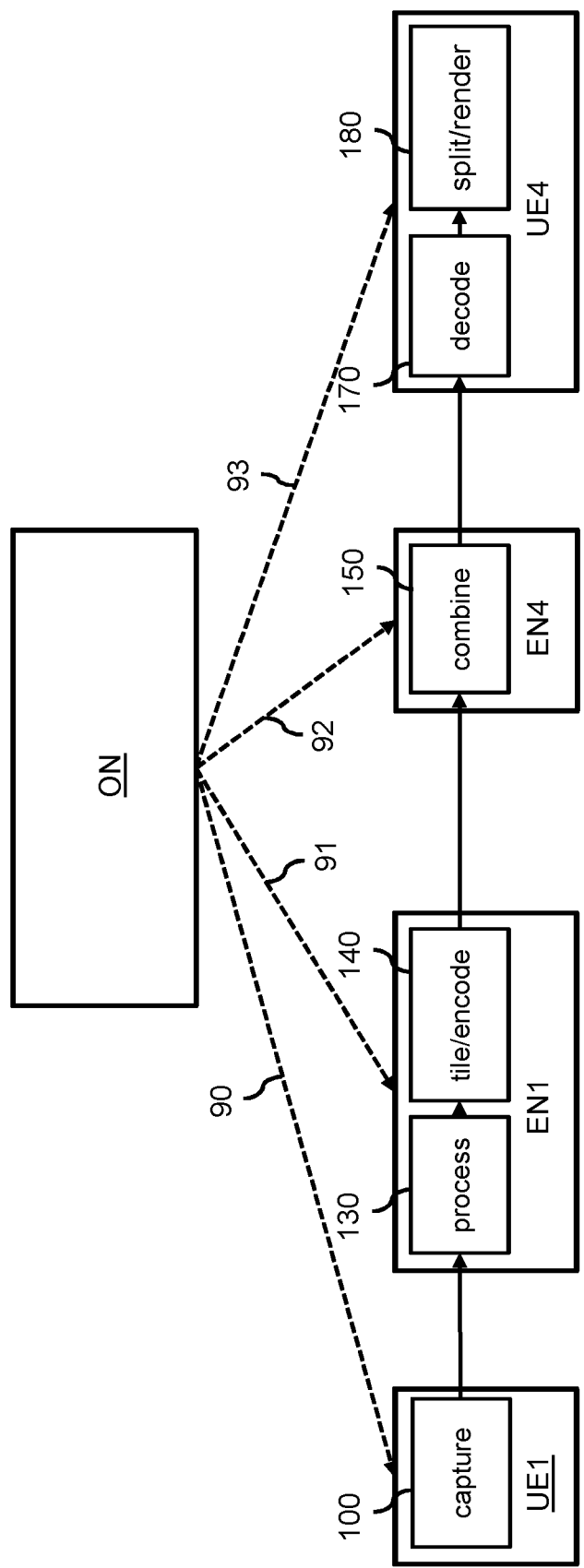
FIG. 11 shows the orchestration node sending instructions to the transmitter device, the edge node, an edge node embodying a combiner, and the receiver device.

FIG. 11 shows the orchestration node ON sending instructions to the transmitter device UE1, the edge node EN1, an edge node EN4 embodying a combiner and the receiver device UE4. Namely, instructions 90 may be sent to the transmitter device UE1 containing the network address (e.g., IP address, port number) of the edge node EN1 to which the transmitter device UE1 is to send its video after capture 100. Such instructions may be part of a signaling between the orchestration node ON and the transmitter device UE1 via which the capabilities of the transmitter device UE1 may be determined, e.g., in terms of computation resources, battery level, etc. The orchestration node ON may, based on this information, decide between having the transmitter device UE1 process and encode the video, or having the edge node EN1 process and encode the video using a tile-based video streaming codec.

Additionally or alternatively, the orchestration node ON may be configured to send instructions 91 to the edge node EN1 which may for example identify one or more of: the transmitter device UE1, which video stream to expect, how to process this video stream, how to tile the processed video and encode the processed video, and where to send the tile-based video stream afterwards, e.g., in the form of a network address (e.g., IP address, port number of edge node EN4) and streaming settings. It is noted that the tile-based video stream may be sent to different entities, for example when the combiner is implemented by a respective edge node of each receiver device.

Additionally or alternatively, the orchestration node ON may be configured to send instructions 92 to the edge node EN4 which may for example identify one or more of: which video stream(s) to expect and how to combine these video stream(s) and where to stream the resulting combined tile-based video stream. It is noted that the combining may involve a specific spatial arrangement, e.g., as previously shown in FIG. 6. As such, the orchestration node ON may instruct the edge node EN4 to combine the tiles of the received video streams to establish a specific spatial arrangement.

Additionally or alternatively, the orchestration node ON may be configured to send instructions 93 to the receiver device UE4 which may for example identify one or more of: the network address of the edge node EN4 which will transmit the combined tile-based video stream, and instructions on how to process this combined tile-based video stream, e.g., identifying how the combined video should be split into separate videos and how the separate videos are to be rendered, e.g., onscreen.

It is noted that any instructions sent by the orchestration node to entities may be sent via so-called 'piggybacking', for example by sending all instructions to the transmitter device UE1 which may then forward the part of the instructions which do not pertain to itself to the following entities, e.g., the edge node(s), the combiner, etc.

With respect to the edge node, the following is noted. Such an edge node is known from the field of edge computing, which essentially involves using a server or a cloud instance close to the edge of the network near the client device (also 'UE' elsewhere). As such, the edge node may represent an edge computing resource or edge computer. To be able to use the edge node, the UE may need to know the network address of the edge node, e.g., in the form of an IP address or other type of identifier of the edge node. There are various ways of ensuring that the UE uses the 'right' edge node, e.g., in terms of network location. The term 'edge node' may be used here to define the closest processing resource, being for example a single server or a combination of servers which may together establish a cloud computing environment.

When using edge computing in combination with media streaming, the IP Multimedia Subsystem (IMS) architectural framework may be used. When using this framework, for each terminal (e.g., transmitter device or receiver device), its connection or attachment point to the telecommunication network may be known. As the network is aware of the attachment point of the UE, the network may also be aware of the closest edge node. IMS may use SIP signaling to route the multimedia streams from a terminal. The setup of a multimedia connection by a terminal may pass to an application server which may direct the multimedia streams to the right network entity, in this case the edge node. The edge node may in such a case be a SIP aware element, e.g., a B2BUA (Back-2-Back User Agent), capable of terminating the multimedia stream and setting up a (processed) multimedia stream to another node.

Alternatively, instead of using the IMS framework, a central server may send the address of the nearest edge node in any other way, e.g. using an XML scheme and by delivering the XML over HTTP. For example, once a UE wishes to start a VR conference session, the central server may identify the edge node to the UE.

Another way for a UE to reach the closest edge node is to use an anycast mechanism. Anycast, also called IP Anycast, may be a mechanism whereby the same destination IP address may be shared amongst several nodes, in this case amongst edge nodes. When the UE sends packets to this anycast address, the nearest router in the network, e.g., an edge router, may route the packets to the nearest node with this anycast IP address. To be able to use this mechanism to route packets to the nearest edge node, the routers in the network may be appropriately configured, either individually or by making each router aware the various routes to this anycast IP address but while considering them as alternative routes to the same node. If the router then performs a shortest path routing mechanism, the router may thereby route packets to the nearest edge node.

With respect to the decision between having the transmitter device process and encode the video, or having the edge node process and encode the video using a tile-based video streaming codec, the following is noted: such a decision may be taken by an orchestration node, but also by the transmitter device itself. Namely, a transmitter device in the form of a UE may dynamically decide between using edge computing or not. This may depend on the resources available on the UE, in terms of processing capacity, in terms of available hardware for media processing (e.g., hardware encoders, GPUs or even FPGAs), in terms of available battery capacity, etc. There are various options on how to select between using edge computing or not. As indicated above, the orchestration node, which may be a conferencing/application server, may instruct the UE to use the edge node. Another option is that the orchestration node may give the UE choice between using the edge node or not. Yet another option is that the UE by itself decides between using the edge node or not, as also described above.

It is noted that even if one UE decides not to use the edge node for processing, if other UEs in the same (communication) session do use an edge node, all videos may need to be encoded as a tile-based video stream for the combination of the video streams in the compressed domain to work. A UE which performs the processing and encoding may thus have to use the same tile-based encoding technique to accommodate its output being suitable for combining with streams of others.

With further reference to the sending of instructions from the orchestration node to other entities, or in general to the signaling between the orchestration node and the other entities, the following is noted. There are several options for such signaling. For example, when the processing is off-loaded from the transmitter device to an edge node using an MPEG NBMP-based technique, JSON or XML signaling over HTTP may be used. Another example is the use of 3GPP IMS-based signaling and the Media Resource Function (MRF) and its signaling, e.g., SIP/XML signaling.

Figure 12:
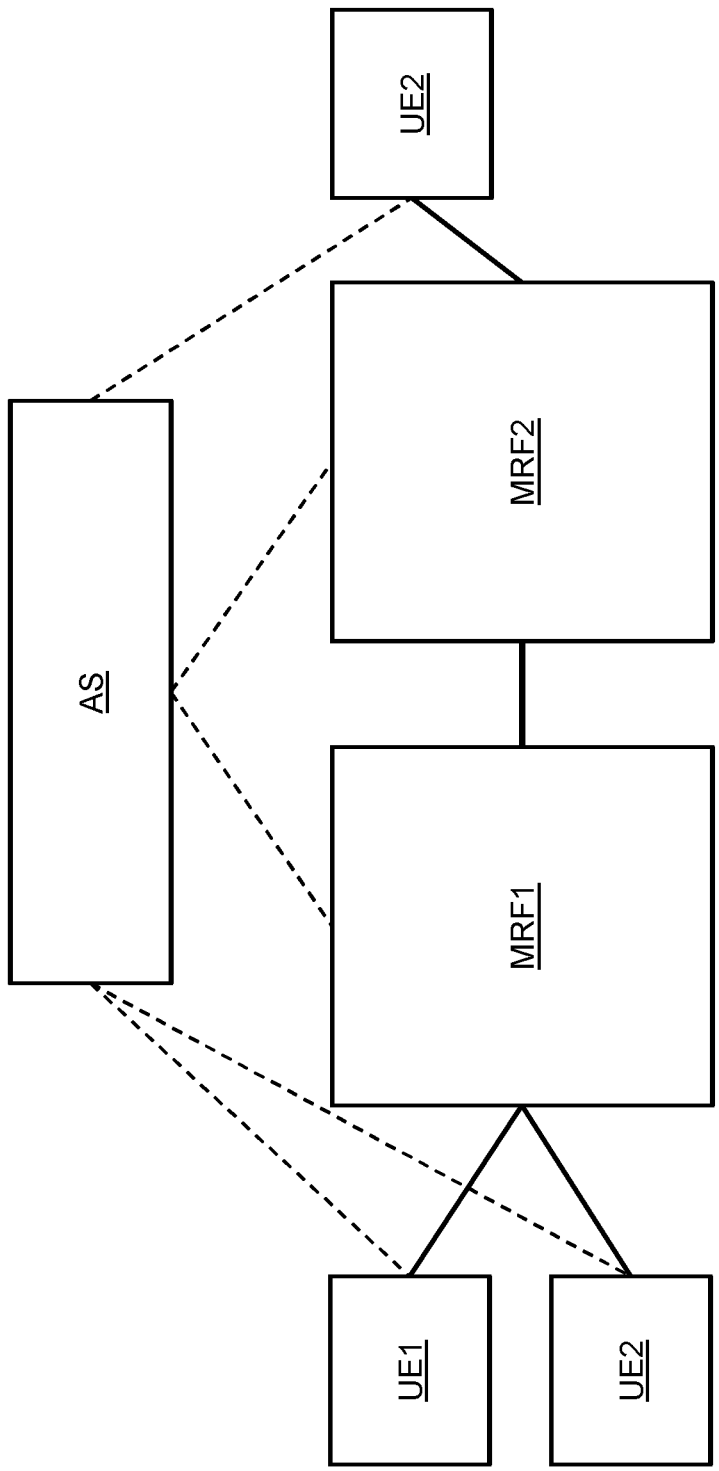
FIG. 12 shows an embodiment using Media Resource Functions.

FIG. 12 shows an embodiment which is based on the Media Resource Function and 3GPP IMS-based signaling, while FIG. 13 shows a message exchange for the FIG. 12 embodiment. Both relate to the following. In SIP/IMS terms, a network node that is able to perform media processing is called a Media Resource Function or MRF. Such an MRF may consist of an MRFC (C=Control) and MRFP (P=Processing), which may be combined or distributed. An application server (AS) may control the MRFs and the connections to the various UEs. In the example of FIGS. 12 and 13, the AS acting as orchestration node may first setup a control channel to MRF1 and MRF2 using a SIP INVITE, after which it is able to instruct and/or configure the MRFs on how to handle incoming media streams. In this example, UE1 and UE2 are directly connected to MRF1 while UE3 is connected to MRF2. In this example, each of the MRFs may be embodied by edge nodes, while in another example, the MRF1 may be an edge node while MRF2 may be a network node is a non-edge network part.

An example yet simplified XML for creating a video conference with two users may be the following, as may be sent by the AS to each MRF. This example may be based on MSML (IETF RFC 5707):

```
<?xml version="1.0" encoding="utf-8"?>
<msml version="1.1">
<MediaServerControl version="1.0">
<request>
<createconference name="example">
<videolayout type="text/msml-basic-layout">
<region id="1" left="0" top="0" relativesize="1/2"/>
<region id="2" left="50%" top="0" relativesize="1/2"/>
</videolayout>
</createconference>
</request>
</msml>
```

In addition, the AS may instruct the UEs to set up a media connection to this MRF using SIP REFER. The SIP REFER may indicate the MRF using for example the message [Refer-To: <sip:conf=uniqueIdentifier©mediaserver.example.net]. This SIP REFER message may also instruct the UE that the bridging of user inputs is performed using tiles, e.g., in the compressed domain. The UEs may set up connections to the MRF to exchange the media. The MRF may add XML to its response, describing which participant is in which region. The AS may also instruct the MRF to join the participants to the conference without decoding/encoding, e.g., using HEVC tiling. A join instruction may take the ID from the user and the ID for the conference and instructs the MRF to join these. Here a new 'method="tiled"' is added to instruct the MRF accordingly.

```
<mscmixer version="1.0" xmlns="urn:ietf:params:xml:ns:msc-mixer">
<join id 1="1536067209:913cd14c" id2="1536067209:913cd14c"/ method="tiled">
</mscmixer>
```

Figure 13A:
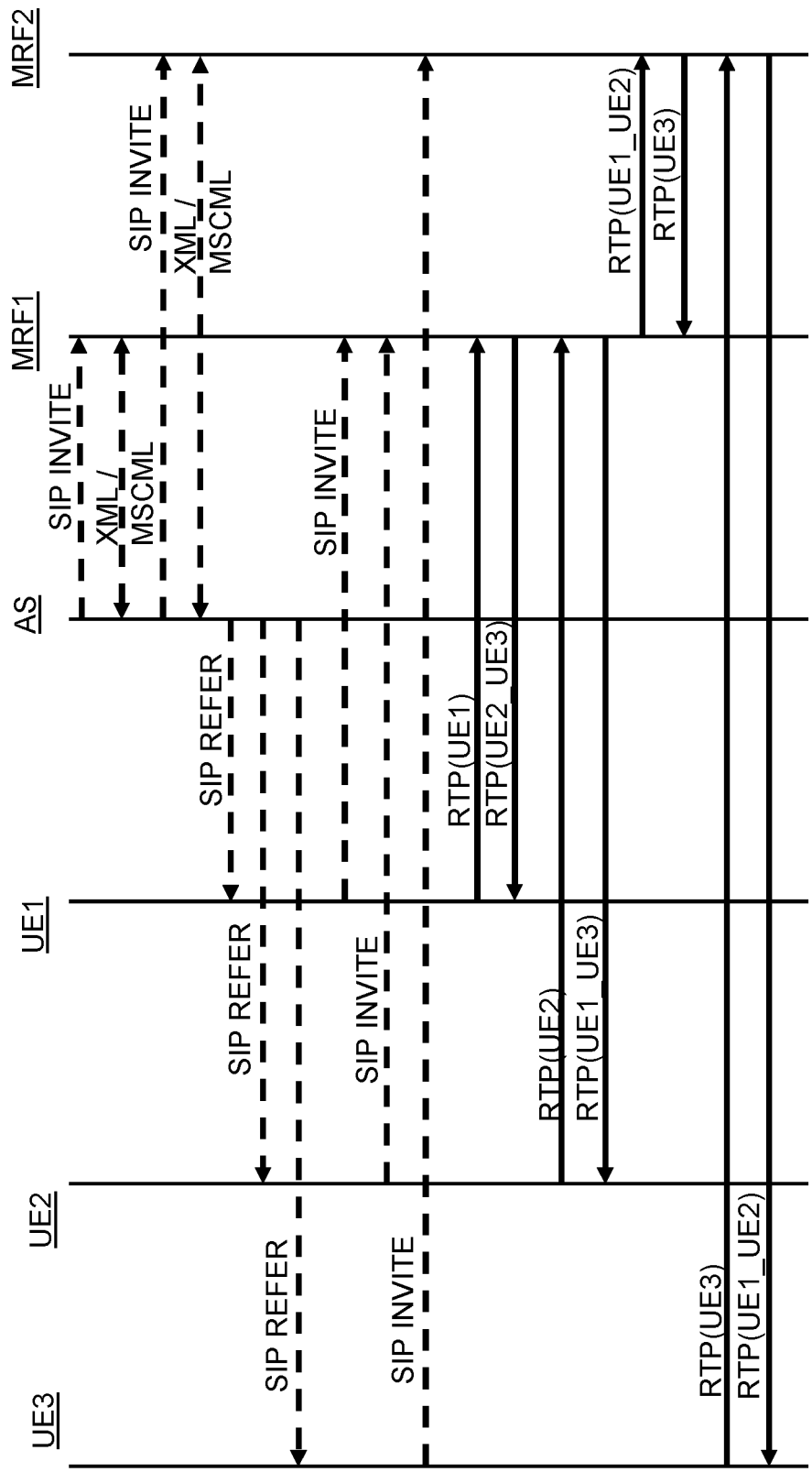
FIG. 13A shows a message exchange for the FIG. 12 embodiment.

Using session control mechanisms for streaming, such as offered by SIP (Session Initiation Protocol, IETF RFC 3261), various ways exist to set up various streams through a network. FIG. 13A shows an example for signaling to set up the various streams of the example, using a server-initiated streaming.

In this example, the Application Server may be aware of three user devices UE1, UE2 and U3 wanting to have a VR conference session, e.g., through a process through a website or the like. As discussed above, the Application Server may be aware of the point of attachment of the various UEs, and thus can assign the appropriate edge servers to each UE. First the Application Server starts a session with the MRF1 and MRF2, in this case using 3rd party call control (3pcc). It sends a SIP INVITE to the first MRF, and awaits the response (SIP 200 OK, not shown here for reasons of brevity). Next, the Application Server can send a SIP INVITE to MRF2, containing the offer of MRF1, thereby establishing a session between MRF1 and MRF2, see also IETF RFC 3725 for alternatives for doing this. By being involved in the signaling between MRF1 and MRF2, the Application Server can indicate the wish for using tiling, e.g., by adding an attribute for this. In the SDP exchanged with SIP, an attribute should indicate the request that tiled streaming is to be used, which may be combined with an indicated resolution (using RFC 6236). For example, a new Media Type may be defined, e.g. 'H265_tile', which may then be used in the rtpmap attribute under 'encoding name':

```
a=rtpmap:<payload type> <encoding name>/<clock rate>[/>encoding parameters>]
```

Alternatively or additionally, instructions can be included in XML format or in MSCML format.

Next, the UEs that are part of the VR conference session are invited, using SIP REFER, to set up sessions to their respective MRFs. An instruction can be added in the invite, e.g. in XML, that the UEs are requested to set up a low-latency/high bandwidth streaming connection to their edge node. Alternatively, as the MRFs are aware of the requirements for the streaming connection to be low-latency/high bandwidth, in their responses to the SIP INVITEs from the UEs, the MRFs can indicate this request.

After all sessions are set up, the RTP flows between the different entities may be exchanged. Each UE may provide their edge node with their respective video capture in a low latency manner, and each may UE receive the tiled combination of the video captures of the other two UEs, indicated by using the underscore. This may thus represent an example of using the edge node near the receiver for combining the tiled video inputs in the compressed domain. Note that the MRF1 already sends the combination of tiles for UE1 and UE2 (UE1_UE2) to MRF2. Note also that there is thus a session between the MRFs, as set up initially by the AS using 3pcc.

Figure 13B:
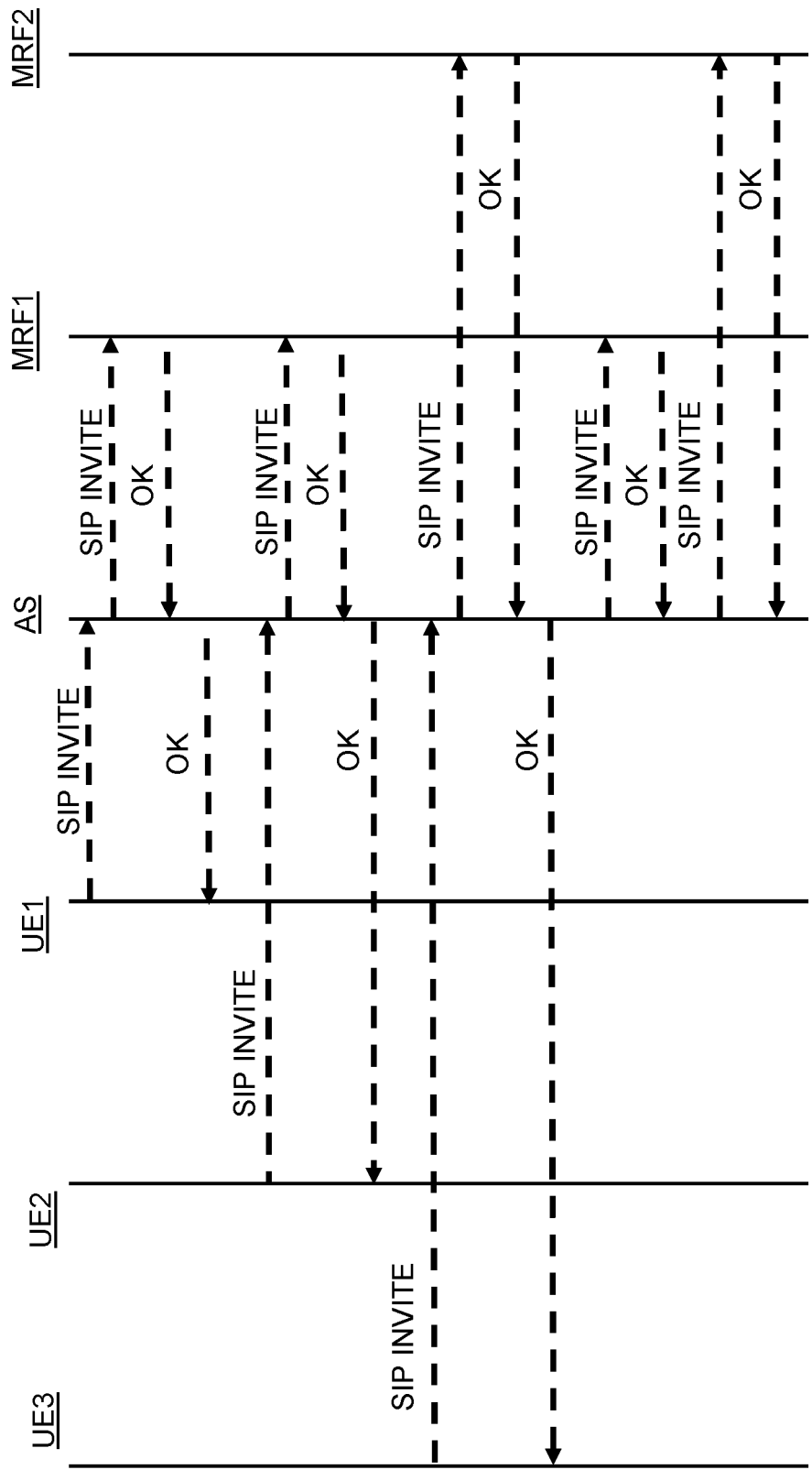
FIG. 13B shows another example of a message exchange.

FIG. 13B shows another method for setting up the appropriate streaming sessions. In this example, the UEs are 'dialing in' the conference, e.g. using a dial-in address shared beforehand. As each UEs sets up a session to this address, the Application Server AS (as a SIP proxy) routes the session to the appropriate MRF. Because of this, the AS may be aware of which UEs are part of the same session, and thus which edge nodes are part of the session. After UE3 has started a session with MRF2, the AS knows it has to start a session between MRF1 and MRF2. This is done in the same manner as in FIG. 13A, where here the OK responses are also showed.

To identify the tiles in the combined result streamed to a participant, a simple numbering could be used, e.g., numbering the tiles in raster scan order from left to right and from top to bottom. Alternatively, the spatial relationship descriptor (SRD) can be used, which is defined for use in an MPD for MPEG-DASH, published as ISO/IEC 23009-1: 2014/Amd 2:2015. The SRD describes a tile by giving the coordinates of the top-left corner, and providing the width and height of the tile and the total width and height of the combination. In this way, each tile can be identified individually.

Figure 14A:
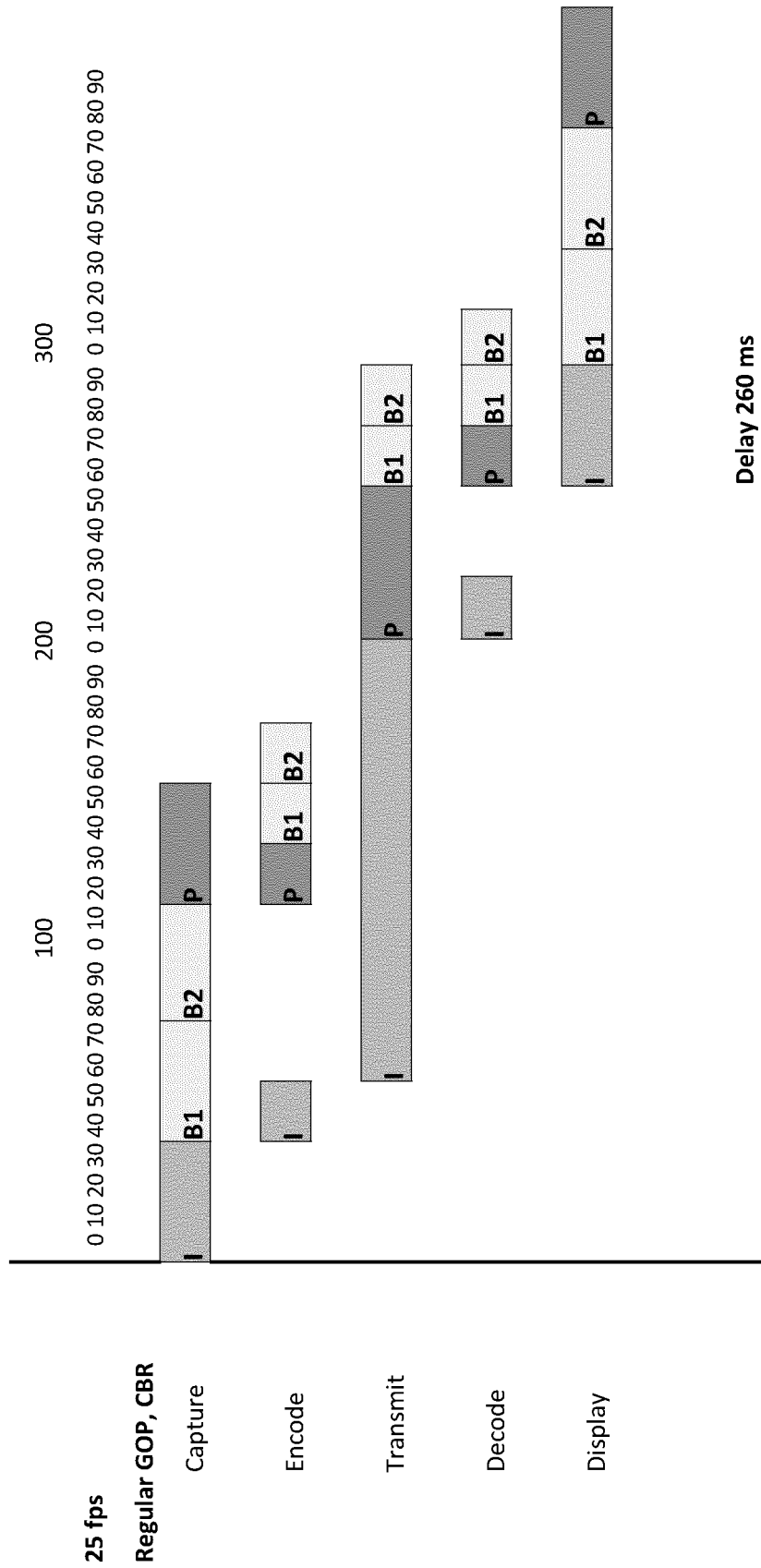
Figure 14B:
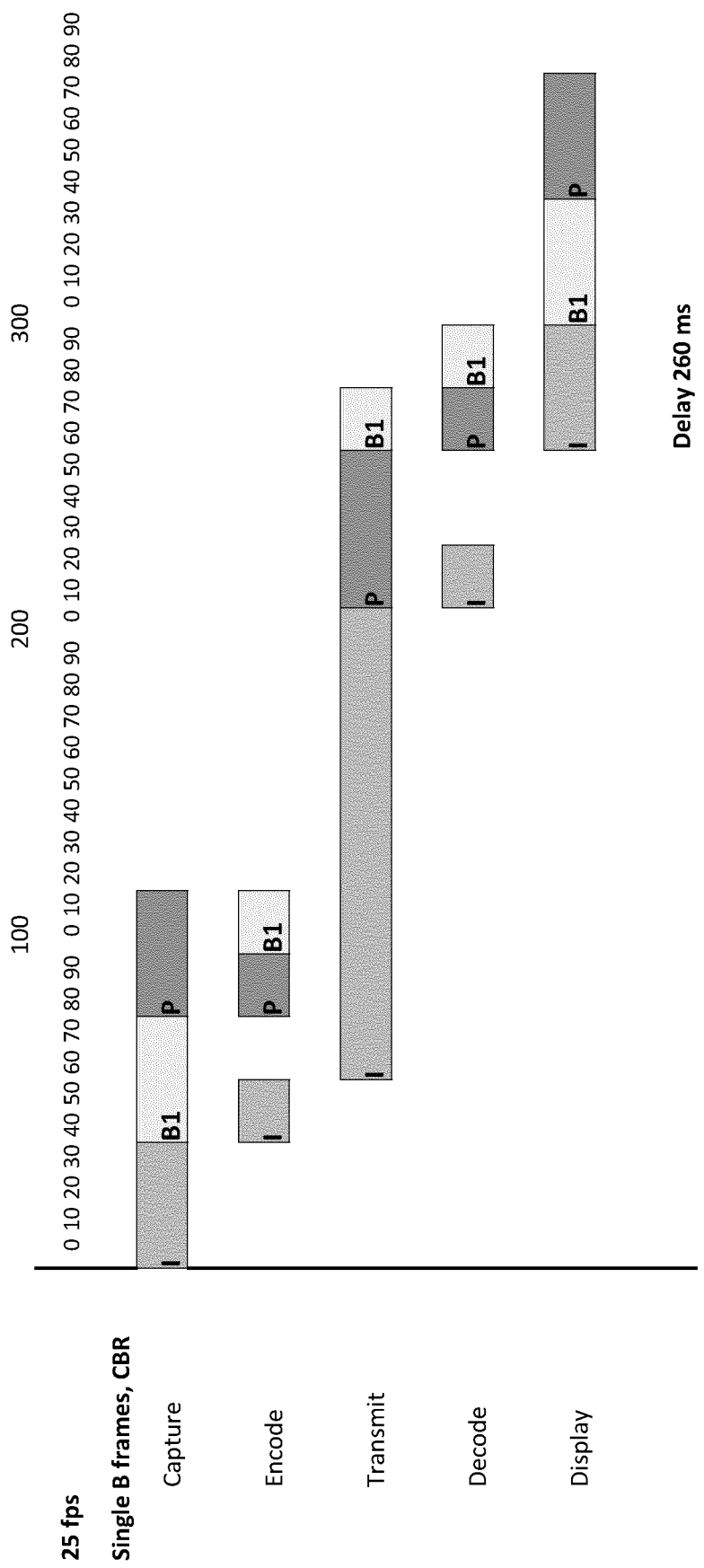

FIGS. 14A-K show approximations of the end-to-end delay in various scenarios, in which FIGS. 14A and 14B may represent reference latency scenarios and may illustrate and serve to define the technical concept of a 'low latency video stream'.

FIG. 14A shows the end-to-end delay for a regular stream. In this case, the Group of Pictures (GOP) consists of an I-frame, followed by 2 B-frames, followed by a P-frame, etc. In FIG. 14A (and in FIGS. 14B-14K), on the horizontal axis, milliseconds are shown. With a frame rate of 25 fps (frames per second), this means there is a new frame every 40 ms. Note that this may not be an exact number, as the shutter time, camera frame throughput, potential post-processing (e.g. changing the color space), etc. may influence exact time. Still, there may be 1 frame roughly every 40 ms. Next, the frames are encoded. The I frame is encoded as-is, but the B-frames can only be encoded once the P-frame is available, so first there may be buffering and once the P-frame is encoded, the B-frames may be encoded. Here the assumption is that all frame encoding and decoding times are 20 ms; in reality this may depend on encoder/decoder used, and the different type of frames may differ somewhat in encoding/decoding time.

As soon as the I-frame is encoded, it may be transmitted. The sizes of the differently encoded frames differ substantially. E.g., using H.264, a rough indication may be that an I-frame has a compression factor of 7, a P-frame of 20 and a B-frame of 50. For an 1080p stream, this may mean that a bandwidth of 5.9 MB/s is achieved: 24 bits color (3×8, RGB)×1920×1080×25=156 MB/s for raw video, using a GOP of 12 (i.e. 1 I-frame, 3 P-frames and 8 B-frames) makes for little under 6 MB/s. An I-frame may then have a size of appr. 0.9 MB, and may take 150 ms to transmit using 6 MB/s bandwidth. A P-frame is appr. 0.3 MB and may take 50 ms, and a B-frame 0.1 MB and may take about 20 ms to transmit. After frames are received, they can be decoded, in the order that they are received. Notice that the P-frame is sent before the B-frames, as it may be needed to decode the B-frames. But, B1 needs to be displayed first, so some buffering may be needed at the receiver. The bottlenecks in this scenario are the transmission of the I-frame, and also the backward prediction used in the B-frames. The achieved end-to-end delay is 260 ms. This end-to-end delay may represent a reference with respect to 'low latency video streaming', in that the latter may achieve a lower, and in some cases, substantially lower end-to-end delay than 260 ms.

In FIG. 14B, the GOP is changed and only a single B-frame is used. This does not change the bottlenecks in the distribution chain, so the delay remains 260 ms.

Figure 14C:
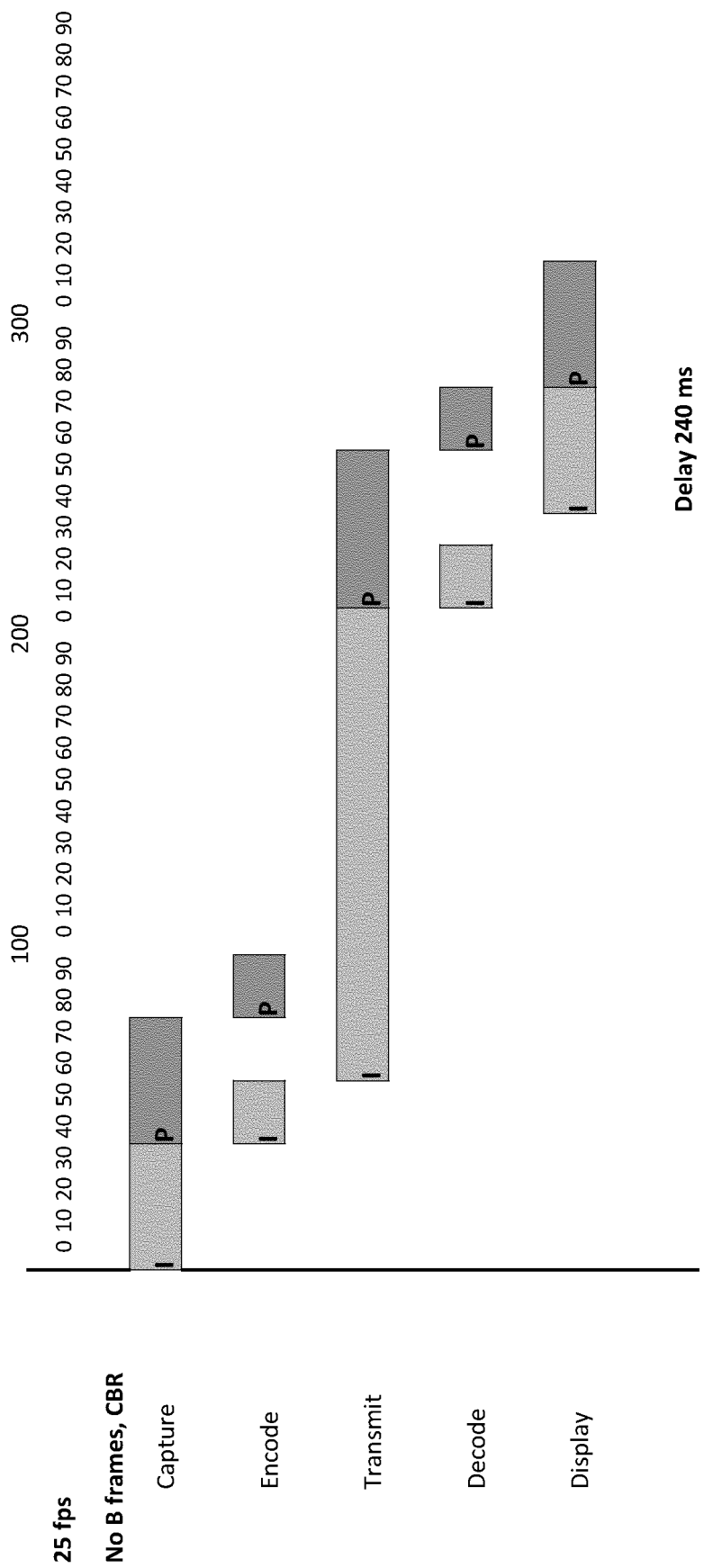

In FIG. 14C, the B-frames are no longer used. This increases the bandwidth of the stream to about 9 MB/s and affects the end-to-end delay. Namely, at the receiver side, the B1 frame is no longer the bottleneck. The end-to-end delay is thereby reduced by 20 ms, corresponding to the decoding time of a single frame.

Another measure to take is to increase or spike the bandwidth, which is in the Figures also indicated by 'spikes'. Transmitting frames at a higher bandwidth than the content bandwidth will reduce their transmission time. This is mostly needed for the I-frame and to some extent for the P-frame. This will not increase the average transmission bandwidth, but may mean that at some moments in time a higher bandwidth is used and at other moments, no bandwidth is used.

In FIG. 14D, the effect of this is shown for the regular GOP and spikes in transmission bandwidth of 5× the content bandwidth. The transmission of the I-frame is no longer the bottleneck, and this significantly reduces end-to-end delays down to 150 ms. The main bottleneck is now the backward prediction used in B-frames.

Figure 14E:
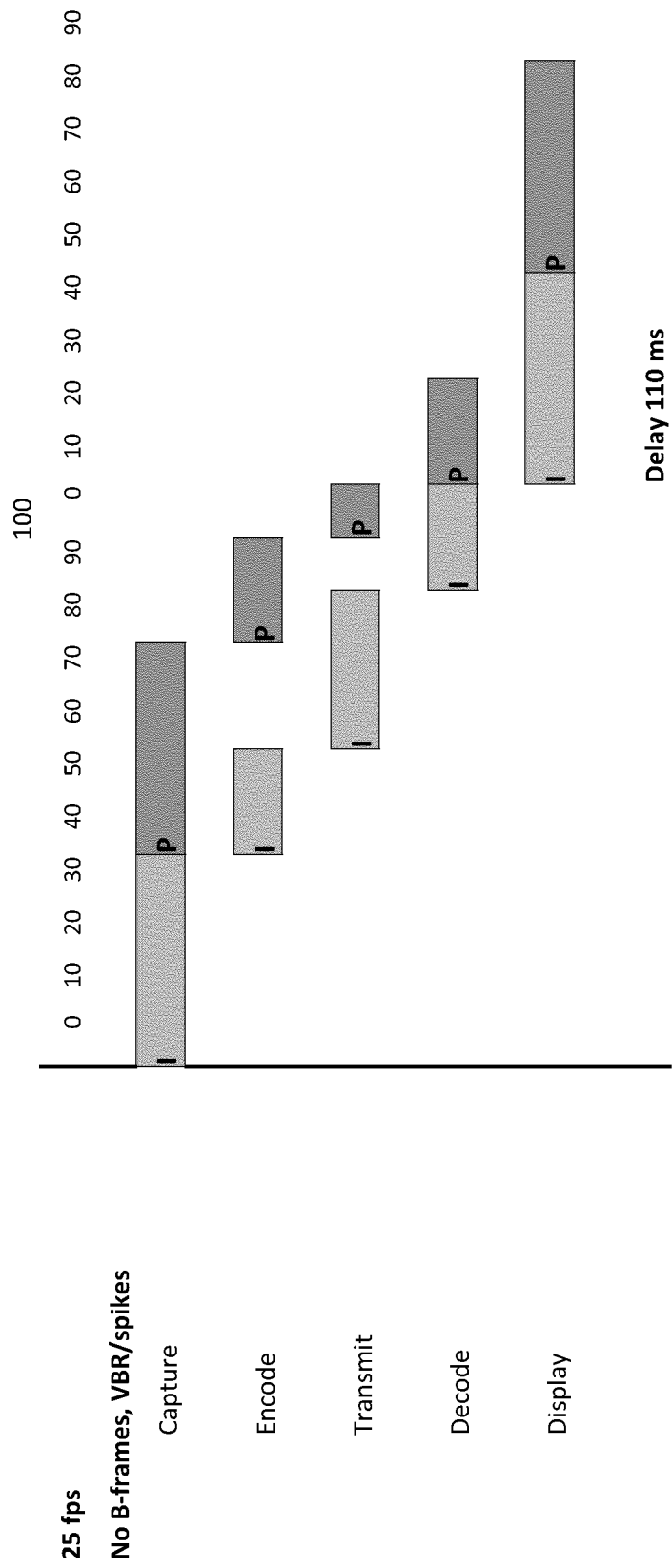

In FIG. 14E combines this spiking of bandwidth (again by a factor of five), which also called Variable Bitrate (VBR), with the use of only forward prediction. Now the I-frame may again be the bottleneck, but the delay is reduced to 110 ms. By combining these two measures, the delay is significantly reduced, from 260 ms to 110 ms.

Another measure to take is to not use I-frames but the spread out the non-prediction (i.e. intra) encoding across multiple frames. This is shown schematically in FIG. 14F, and is called Gradual Decoder Refresh or Progressive Intra Refresh. First, the top left corner is intra-encoded (e.g., without dependencies on other frames, non-prediction), the rest is encoded using forward prediction. Next, the top right corner, bottom left corner, bottom right corner, etc. The insert behind the 'capture' line at 170 ms shows an example for four consecutive frames. For a GOP size of 12, one can imagine having 1/12 of the frame intra-encoded. With this way of encoding, the bandwidth of the content is quite even across frames, so this can be seen as an alternative to spiking the bandwidth. A downside may be that it may take an entire GOP before the full image is shown, as an intra-encoded image is needed to start decoding. This could be combined, e.g., starting with an I-frame and send that at higher speed, and then switch to GDR/PIR. The end-to-end delay is 120 ms, similar to that in FIG. 14E.

Figure 14F:
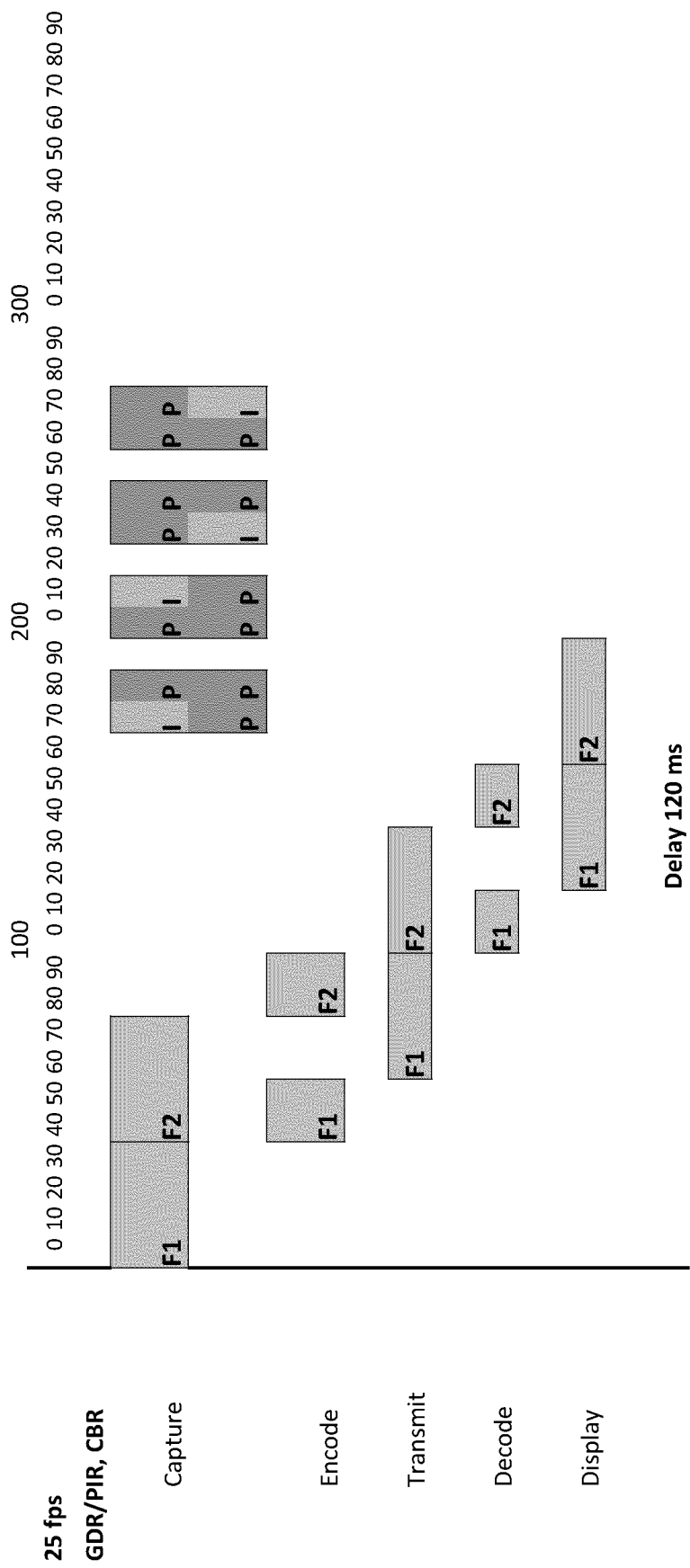
Figure 14G:
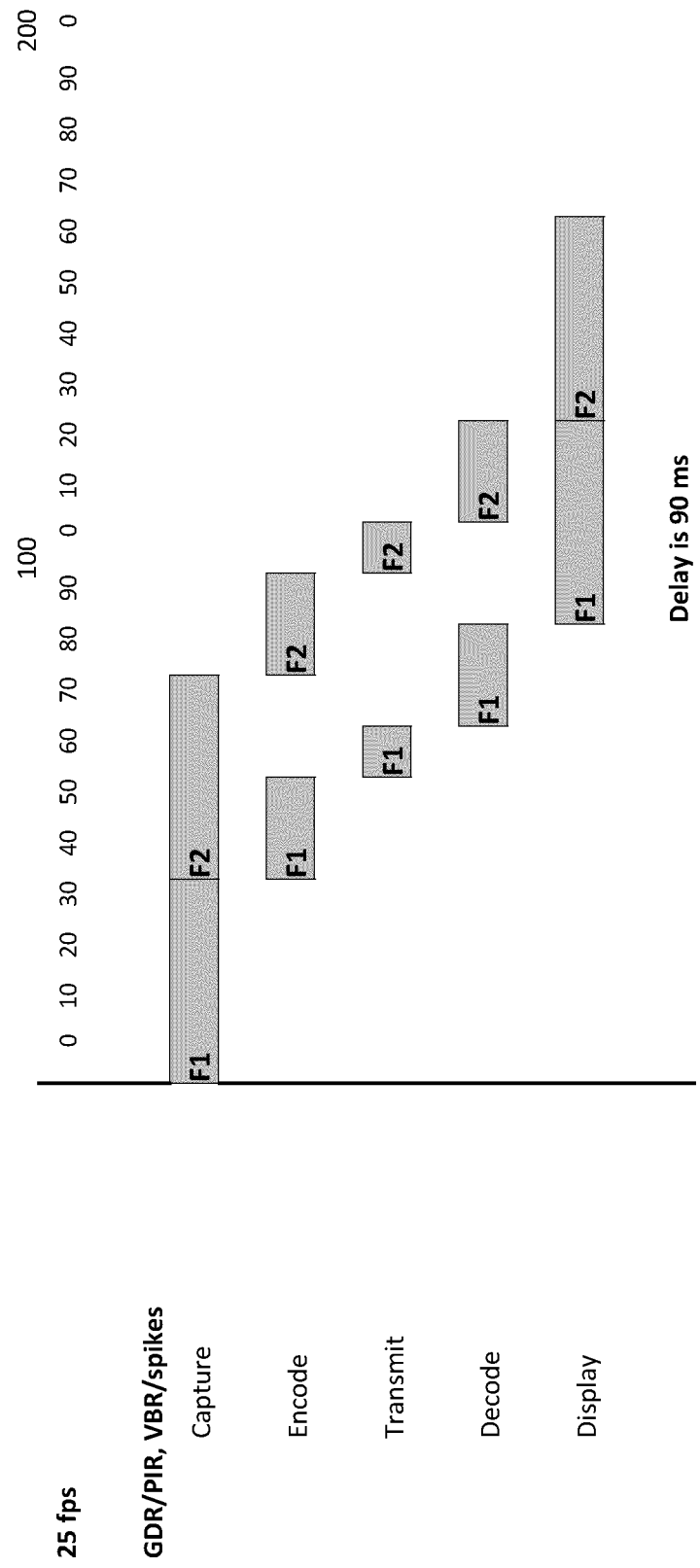

Still, the transmission may remain a bottleneck, as can be seen in FIG. 14F. By also spiking the bandwidth (here with a factor of 4 compared to the content bandwidth), as also shown in FIG. 14G, this can be further improved, reaching a delay of 90 ms. As indicated earlier, by combining multiple steps (no backward prediction, use faster transmission/spiking, using GDR/PIR encoding), the end-to-end delay can (significantly) reduced compared to the reference scenario.

Figure 14H:
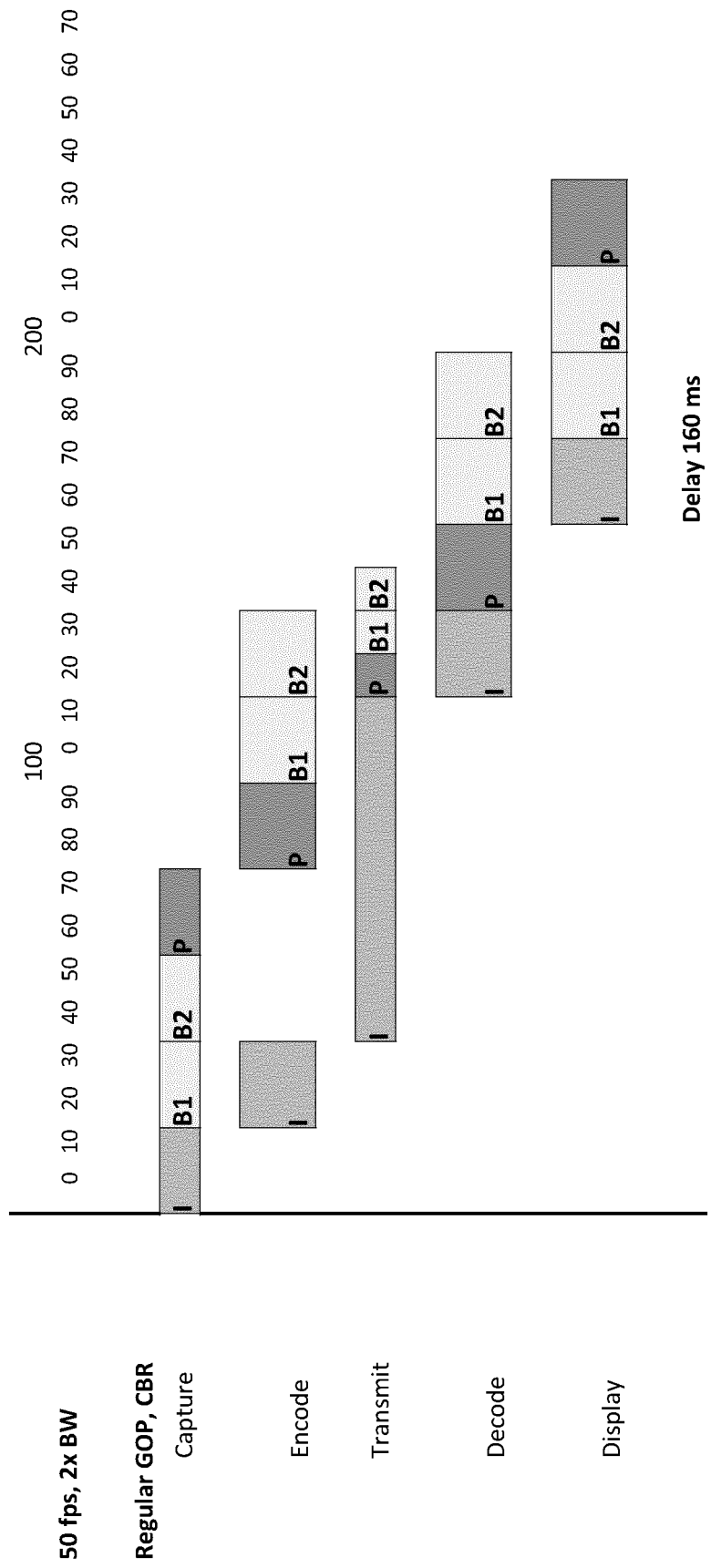
Figure 14I:
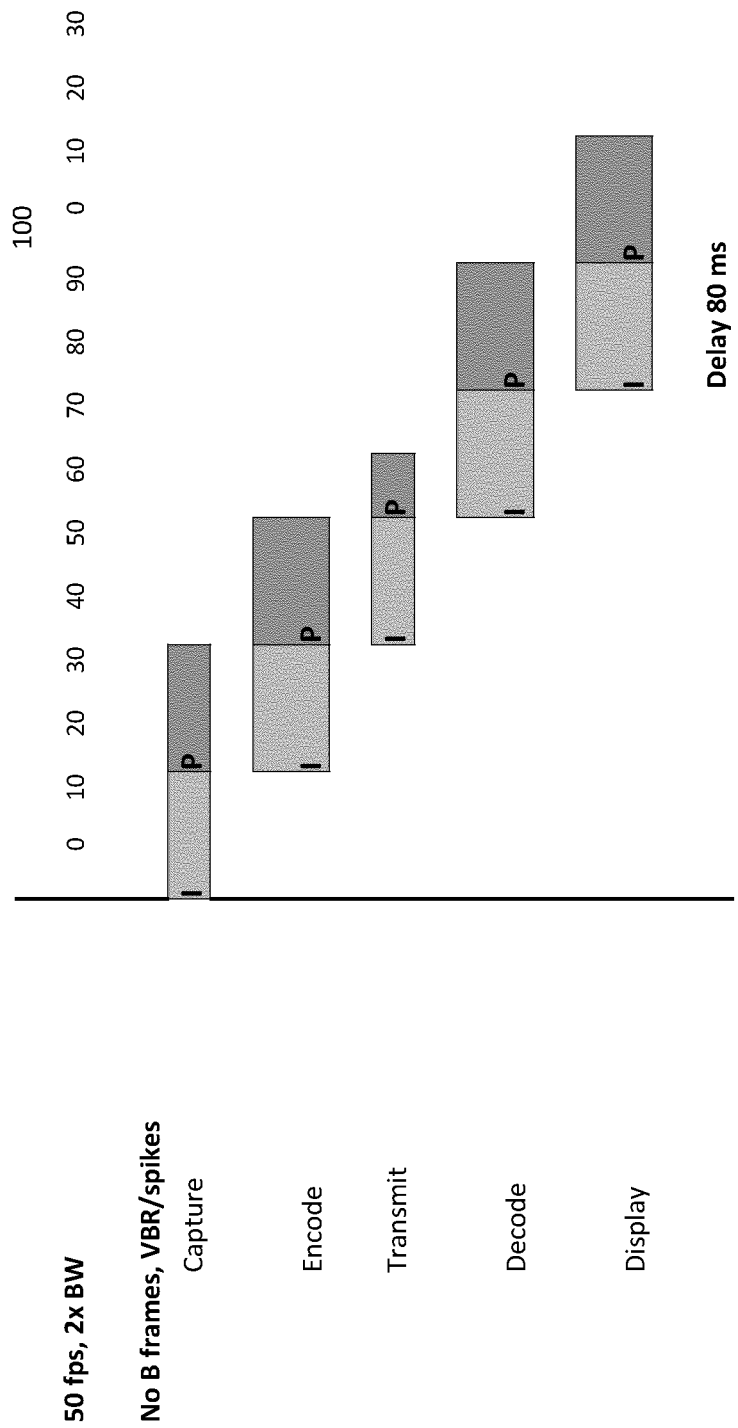

Another way to reduce delays is using a higher framerate, which improves the delay in capture, at the cost of double the bandwidth, as shown in FIG. 14H. This scenario shows a regular GOP, as also shown in scenario 1, but then with 50 fps instead of 25 fps, with the latter being the original content framerate. As this may use double the bandwidth, the transmission of an I-frame will also take half the time compared to the scenario of FIG. 14A. In this way, the delay is reduced to 160 ms. Combining this with not using backward prediction and further spiking the bandwidth used, delay can be reduced to 80 ms, as shown in FIG. 14I. In this example, the spiking is by a factor of 2.5 of the content bandwidth. Alternatively, GDR/PIR may be applied as well, and combining all measures brings the delay down to 70 ms, as shown in FIG. 14J. In this example, the spiking is by a factor of 2.0 of the content bandwidth.

Figure 14K:
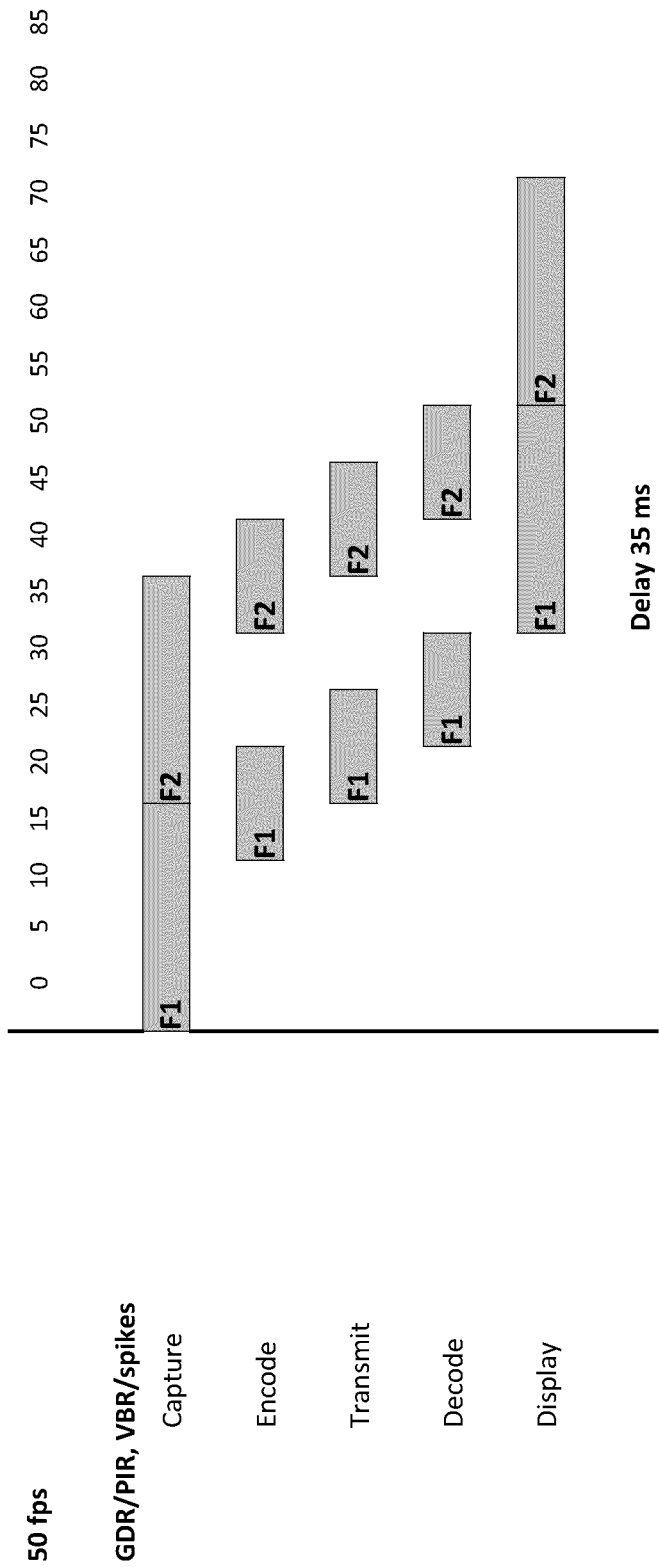

Finally, end-to-end delay can further be reduced by parallelization of the different steps. While capturing a frame, the first parts of a frame that is being captured, may already be sent to the encoder, thus parallelizing capture and encoding. After encoding the first parts of a frame, these can already be transmitted while encoding further parts of a frame. And, as soon as these first parts arrive at the receiver, decoding may also start before the whole frame is received. Combining all measures may lead to an end-to-end delay of 35 ms, as shown in FIG. 14K where a shutter time is assumed of 20 ms, a rolling shutter is assumed leading to the start of encoding during capture, a bandwidth spiking of a factor of 2.0 is used in which transmission is started during encoding, and a start of decoding a frame during transmission.

Further reductions may be achieved by shortening the encoding and decoding times, e.g., by configuring for faster encoding (at the cost of lower quality), or by using a hardware encoder or other hardware acceleration, e.g. GPU acceleration.

In general, the techniques described in this specification are not limited to video-based VR nor to video-based communication use cases, but may be applied to any use case in which several transmitter devices transmit videos which need to be processed and in which a receiver device is to receive the processed videos.

As tile-based streaming codec, any known and future tile-based video streaming codec may be used, including but not limited to a codec based on the tiling mechanisms being developed in H.266/VVC, which are expected to contain advanced multi-configuration tiles, in that certain tiles may be streamed at higher framerates than others, or at other decoder settings, allowing low latency and high-quality tiles to be combined in single VVC frames. Such techniques may be used to further reduce the delay of self-views if the self-view is encoded as a tile to be combined with other tiles.

The techniques described in this specification may be used to generate multiple different combined tile-based streams, e.g., two combined streams each containing the videos of four transmitter devices, using different combiners or a same combiner. These multiple different combined tile-based streams may be sent to different receiver devices, but also to a same receiver device, for example if the decoding limitations of the receiver device do not require a single video stream but rather impose limits in the spatial resolution or bitrate of each individual video stream and which may otherwise be exceeded by a single combined tile-based video stream.

Multiple transmitter devices may be connected to the same edge node. In this case, the edge node may immediately combine the respective videos in a tile-based video stream which may then later be combined with other tile-based video streams, e.g., further along the transmission chain by a further combiner or edge node.

Figure 15:
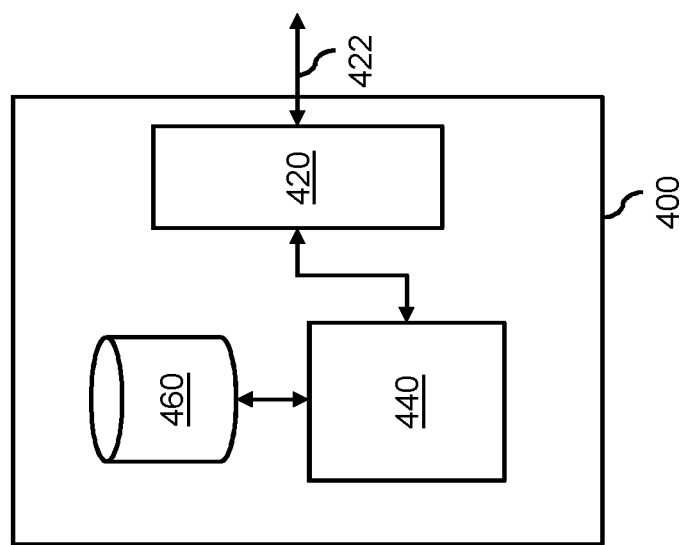
FIG. 15 shows a processor system embodying entities such as an edge node, a combiner, an orchestration node, or a transmitter device.

FIG. 15 shows a processor system 400 embodying entities as described elsewhere in this specification, such as an edge node, a combiner and orchestration node, a transmitter device, a receiver device or in general a UE. The processor system 400 is shown to comprise a network interface 420 for sending and receiving data via network data communication 422. The network interface 420 may be any suitable type of network interface, such a wireless network interface, e.g., based on Wi-Fi, Bluetooth, ZigBee, 4G or 5G mobile communication, or a wired network interface, e.g., based on Ethernet or optical fiber. For example, the network interface 420 may be a local area network (LAN) network interface or an interface to wide area network (WAN) such as the Internet. In particular, if the processor system 400 embodies a UE, the network interface 420 may be a network interface to an access network and may be a type of network interface which corresponds to the particular type of access network.

The processor system 400 is further shown to comprise a processor subsystem 440 which may be configured, e.g., by hardware design or software, to perform operations described elsewhere in this specification in as far as relating to the described functions of the respective entities (edge node, combiner, orchestration node, transmitter device, receiver device, UE). For example, the processor subsystem 440 may be embodied by a single Central Processing Unit (CPU), but also by a combination or system of such CPUs and/or other types of processing units, such as for example Graphics Processing Units (GPUs). The processor system 400 is further shown to comprise a data storage 460, such as internal memory, a hard disk, a solid-state drive, or an array thereof, which may be used to store or buffer data such as received parts of the video stream and/or decoded or processed video data parts.

The processor system 400 is may be embodied by a (single) device or apparatus. For example, the processor system 400 may, when representing a transmitter device or receiver device or another type of UE, be a smartphone, personal computer, laptop, tablet device, gaming console, set-top box, television, monitor, projector, smart watch, smart glasses, media player, media recorder, head mounted display device, etc. The processor system 400 may also be embodied by a distributed system of such devices or apparatuses. In other examples, for example in those in which the processor system 400 represents an edge node or a combiner or an orchestration node, the processor system 400 may be embodied by a server or by a distributed system of servers, or in general by one or more network elements.

In general, the processor system 400 of FIG. 15 may be embodied as, or in, a device or apparatus. The device or apparatus may comprise one or more (micro)processors which may represent the processor subsystem 440 of the processor system 400 and which may execute appropriate software. Software implementing the functionality of the processor subsystem 440 may have been downloaded and/or stored in a corresponding memory or memories, e.g., in volatile memory such as RAM or in non-volatile memory such as Flash. Alternatively, the processor subsystem 440 may be implemented in the device or apparatus in the form of programmable logic, e.g., as a Field-Programmable Gate Array (FPGA). In general, each unit of the processor system 400 may be implemented in the form of a hardware circuit. If the processor system 400 is a distributed system, the processor subsystem 440 may also be a distributed subsystem such as a distributed subsystem of (micro)processors.

Figure 16:
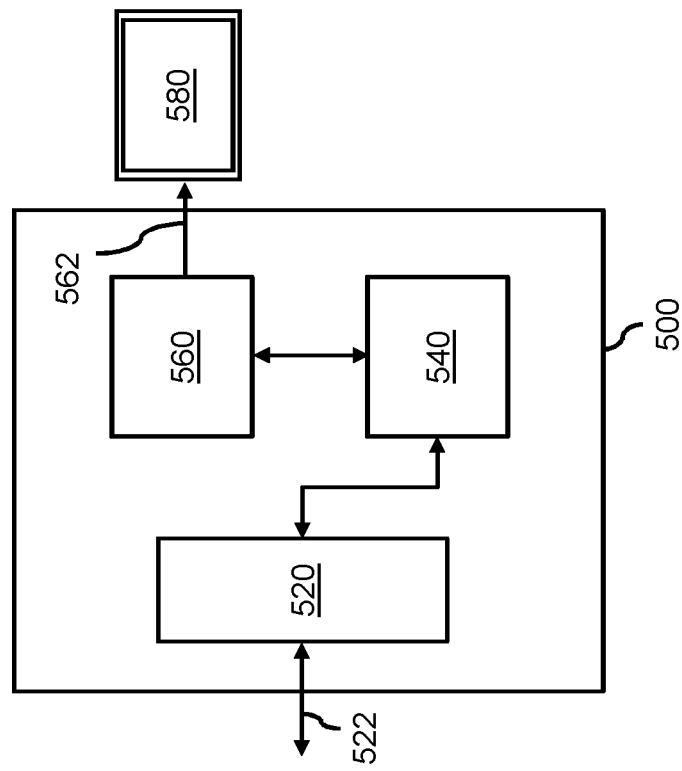
FIG. 16 shows a processor system embodying a receiver device.

FIG. 16 shows a processor system 500 embodying a receiver device, which may also be a combined receiver-transmitter device. As in the case of the processor system 400 of FIG. 15, the processor system 500 of FIG. 16 is shown to comprise a network interface 520 for network data communication 522, which may be a same type of network interface as described with reference to FIG. 15 for the network interface 420. Moreover, as in the case of the processor system 400 of FIG. 15, the processor system 500 of FIG. 16 is shown to comprise a processor subsystem 540, which may be a same type of processor subsystem as described with reference to FIG. 15 for the processor subsystem 440. However, in the example of FIG. 16, the processor system 500 is further shown to comprise a display output 560 for outputting display data 562 to a display 580, such as an HMD. Although FIG. 16 shows the display 580 to be an external display, in some embodiments, the processor system 500 may comprise or may be integrated into the display 580. Using the display output 560, the processor system 500 may display video, such as any received combined tile-based video stream. To generate the display data 562, the processor subsystem 540 may comprise one or more CPUs and one or more GPUs. For example, the GPU(s) may perform the actual rendering and the CPU(s) the higher-level orchestration of the rendering.

Figure 17:
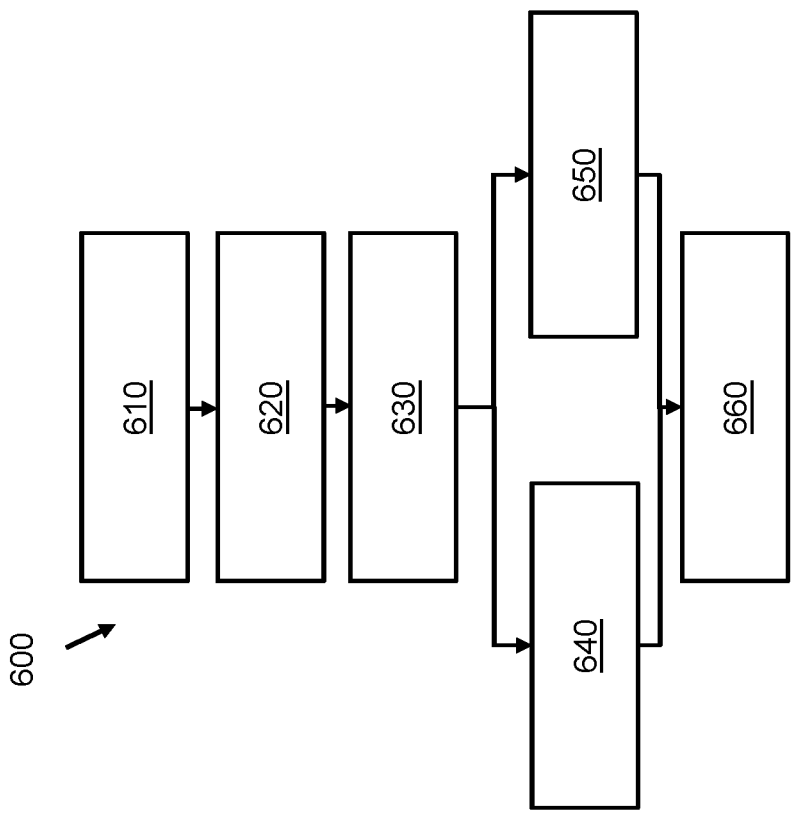
FIG. 17 shows a method for facilitating a video streaming.

FIG. 17 shows a computer-implemented method 600 for facilitating a video streaming which comprises a plurality of transmitter devices each transmitting a respective video via a telecommunication network and a receiver device receiving the respective videos via the telecommunication network, wherein said devices are connected to the telecommunication network via respective access networks. The method 600 may comprise, at an edge node of the telecommunications network, in a step titled "RECEIVING VIDEO", receiving 610 video from at least one of the plurality of transmitter devices as a video stream which contains the video in uncompressed form or in compressed form as a low latency video stream, in a step titled "PROCESSING VIDEO", processing 620 the video using one or more processing techniques to obtain processed video, and in a step titled "ENCODING VIDEO TO OBTAIN TILE-BASED VIDEO", encoding 630 the processed video as one or more tiles using a tiled video streaming codec to obtain a tile-based video stream. The method 600 may further comprise, at another network entity or edge node or a receiver device, in a step titled "RECEIVING TILE-BASED VIDEO", receiving 640 the tile-based video stream from the edge node, in a step titled "RECEIVING FURTHER TILE-BASED VIDEO", receiving 650 at least one other tile-based video stream containing the video transmitted by another transmitter device, and in a step titled "COMBINING TILE-BASED VIDEOS", in a compressed domain, combining 660 the tile-based video stream and the at least one other tile-based video stream to obtain a combined tile-based video stream containing tiles of the videos of at least two transmitter devices.

It will be appreciated that, in general, the steps of the computer-implemented method 600 of FIG. 17 may be performed in any suitable order, e.g., consecutively, simultaneously, or a combination thereof, subject to, where applicable, a particular order being necessitated, e.g., by input/output relations. For example, steps 640 and 650 may be performed simultaneously or overlapping in time. It is further noted that the steps of the computer-implemented method 600 pertaining to the edge node, e.g., steps 610, 620 and 630, may be embodied by a first computer-implemented method, while the steps of the computer-implemented method 600 pertaining to the other network entity or edge node or the receiver device, e.g., steps 640, 650 and 660, may be embodied by a second and thereby separate computer-implemented method.

Figure 18:
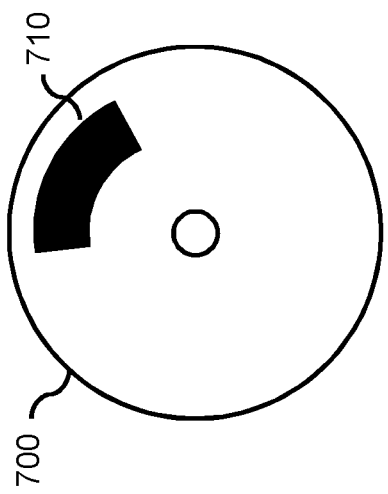
FIG. 18 shows a computer-readable medium comprising non-transitory data.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 700 as for example shown in FIG. 18, e.g., in the form of a series 710 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 18 shows by way of example an optical storage device 700.

In an alternative embodiment of the computer readable medium 700 of FIG. 18, the computer readable medium 700 may comprise transitory or non-transitory data 510 representing an instruction or signaling message as described in this specification.

Figure 19:
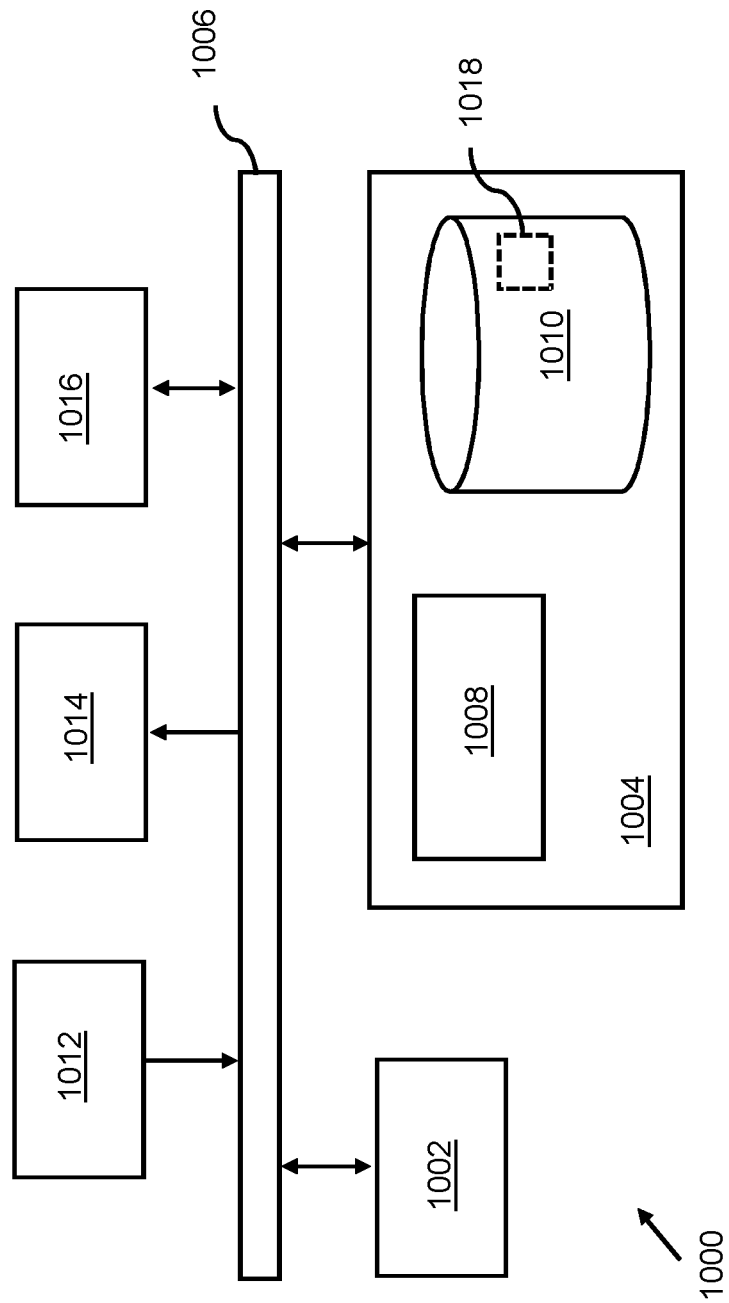
FIG. 19 shows an exemplary data processing system.

FIG. 19 is a block diagram illustrating an exemplary data processing system 1000 that may be used in the embodiments described in this specification. Such data processing systems include data processing entities described in this specification, including but not limited to any transmitter device, edge node, combiner, orchestration node, application server, receiver device, client device, UE, MRF, etc.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 19, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a transmitter device or receiver device. In that case, application 1018 may represent an application that, when executed, configures data processing system 1000 to perform the functions described with reference to either of said devices. In another example, data processing system 1000 may represent an edge node. In that case, application 1018 may represent an application that, when executed, configures data processing system 1000 to perform the functions described with reference to an edge node. In another example, data processing system 1000 may represent a combiner. In that case, application 1018 may represent an application that, when executed, configures data processing system 1000 to perform the functions described with reference to a combiner.

In accordance with an abstract of the present specification, a system and computer-implemented method are provided for facilitating a video streaming which comprises a plurality of transmitter devices each transmitting a respective video via a telecommunication network and a receiver device receiving the respective videos via the telecommunication network. The system may comprise an edge node which may receive video from a transmitter device in uncompressed form or in compressed form as a low latency video stream, process the video and encode the processed video as a tile-based video stream. A combiner may then, in the compressed domain, combine any received tile-based video streams to obtain a combined tile-based video stream which contains tiles of the videos of at least two transmitter devices and which may be decodable by a single decoder instance.

In the claims, any reference signs placed between parentheses shall not be construed as limiting the claim. Use of the verb "comprise" and its conjugations does not exclude the presence of elements or steps other than those stated in a claim. Expressions such as "at least one of A, B, and C" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed:

1. A system for facilitating video streaming, the system comprising a plurality of transmitter devices each transmitting a respective video via a telecommunication network and a receiver device receiving the respective videos via the telecommunication network, wherein the plurality of transmitter devices and the receiver device are connected to the telecommunication network via respective access networks, the system comprising:

an edge node of the telecommunication network, wherein the edge node is configured to:
  receive video from at least one of the plurality of transmitter devices as a video stream which contains the video in uncompressed form or in compressed form as a low latency video stream;
  process the video using one or more processing techniques to obtain processed video;
  encode the processed video as one or more tiles using a tiled video streaming codec to obtain a tile-based video stream;
a combiner configured to:
  receive the tile-based video stream from the edge node;
  receive at least one other tile-based video stream containing the video transmitted by another transmitter device;
  in a compressed domain, combine the tile-based video stream and the at least one other tile-based video stream to obtain a combined tile-based video stream containing tiles of the respective video of at least two transmitter devices.

2. The system according to claim 1, wherein the combiner is or is part of one of a group of:
  an edge node assigned to the receiver device;
  a network node in a non-edge part of the telecommunication network between the other transmitter device and the receiver device; and
  a subsystem of the receiver device.

3. The system according to claim 1, wherein the system comprises multiple combiners which are mutually arranged in a hierarchical structure such that at least one combiner receives the combined tile-based video stream of at least one other combiner and generates a further combined tile-based video stream which includes the tiles of the received combined tile-based video stream.

4. The system according to claim 3, wherein the multiple combiners are or are part of at least two different ones of a group of:
  an edge node assigned to the receiver device;
  a network node in a non-edge part of the telecommunication network between the other transmitter device and the receiver device; and
  a subsystem of the receiver device.

5. The system according to claim 1, further comprising an orchestration node configured to orchestrate the processing of the video by the edge node by transmitting instructions to the at least one of the plurality of transmitter devices and/or the edge node.

6. The system according to claim 5, wherein the orchestration node is configured to assign the edge node to the at least one of the plurality of transmitter devices by informing the at least one of the plurality of transmitter devices of a network identifier of the edge node.

7. The system according to claim 5, wherein the orchestration node is configured to generate instructions for the edge node containing at least one of:
  a selection or configuration of the one or more processing techniques;
  a configuration for the encoding of the one or more tiles; and
  a network identifier of the combiner.

8. A transmitter device configured for transmitting a video via a telecommunication network, wherein the transmitter device is connected to the telecommunication network via an access network,
  wherein the transmitter device is configured to transmit the video to an edge node of the telecommunication network, wherein the edge node is configured to process the video using one or more processing techniques to obtain processed video and to encode the processed video as one or more tiles using a tiled video streaming codec to obtain a tile-based video stream, and
  wherein the transmitter device is configured to transmit the video to the edge node as a video stream which contains the video in uncompressed form or in compressed form as a low latency video stream.

9. The transmitter device according to claim 8, wherein the transmitter device is configured to switch between a) transmitting the video stream in uncompressed or in compressed form as a low latency video stream to the edge node for processing, and b) processing the video and transmitting the video stream in compressed form with backward prediction, wherein said switching is based on at least one of a group of:
  an instruction received from another entity;
  an availability of computing resources in the transmitter device;
  an availability of network resources available for streaming; and
  a battery level of the transmitter device.

10. The transmitter device according to claim 8, wherein the transmitter device is configured to generate instructions for the edge node containing at least one of:
  a selection or configuration of the one or more processing techniques;
  a configuration for the encoding of the one or more tiles; and
  a network identifier of a combiner to which the tile-based video stream is to be transmitted to be combined in a compressed domain with one or more other tile-based video streams.

11. An edge node of a telecommunication network, wherein the edge node is configured for facilitating a video streaming which comprises a plurality of transmitter devices each transmitting a respective video via a telecommunication network and a receiver device receiving the respective videos via the telecommunication network, wherein said devices are connected to the telecommunication network via respective access networks, wherein the edge node is configured to:
  receive video from a transmitter device as a video stream which contains the video in uncompressed form or in compressed form as a low latency video stream;
  process the video using one or more processing techniques to obtain processed video; and
  encode the processed video as one or more tiles using a tiled video streaming codec to obtain a tile-based video stream.

12. A computer-implemented method for facilitating a video streaming which comprises a plurality of transmitter devices each transmitting a respective video via a telecommunication network and a receiver device receiving the respective videos via the telecommunication network, wherein said devices are connected to the telecommunication network via respective access networks, the method comprising:
  at an edge node of the telecommunication network:
    receiving video from at least one of the plurality of transmitter devices as a video stream which contains the video in uncompressed form or in compressed form as a low latency video stream;
    processing the video using one or more processing techniques to obtain processed video;

encoding the processed video as one or more tiles using a tiled video streaming codec to obtain a tile-based video stream;

at another network entity or edge node or a receiver device:

receiving the tile-based video stream from the edge node;

receiving at least one other tile-based video stream containing the video transmitted by another transmitter device;

in a compressed domain, combining the tile-based video stream and the at least one other tile-based video stream to obtain a combined tile-based video stream containing tiles of the videos of at least two transmitter devices.

13. A non-transitory computer-readable medium comprising a computer program, the computer program comprising instructions for causing a processor system to perform the method according to claim 12.

* * * * *